US012706481B2

(12) United States Patent
Elshafie et al.

(10) Patent No.: US 12,706,481 B2
(45) Date of Patent: Aug. 11, 2026

(54) ADAPTIVE ALLOCATION TIMING FOR ENERGY HARVESTING DEVICES

(71) Applicant: QUALCOMM Incorporated, San Diego, CA (US)

(72) Inventors: Ahmed Elshafie, San Diego, CA (US); Huilin Xu, Temecula, CA (US); Linhai He, San Diego, CA (US); Wanshi Chen, San Diego, CA (US); Yuchul Kim, San Diego, CA (US); Wei Yang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 512 days.

(21) Appl. No.: 18/173,692

(22) Filed: Feb. 23, 2023

(65) Prior Publication Data

US 2024/0291318 A1 Aug. 29, 2024

(51) Int. Cl.
*H02J 50/00* (2016.01)
*H02J 50/80* (2016.01)
*H04W 72/0446* (2023.01)
*H04W 72/51* (2023.01)

(52) U.S. Cl.
CPC ............ *H02J 50/001* (2020.01); *H02J 50/80* (2016.02); *H04W 72/0446* (2013.01); *H04W 72/51* (2023.01)

(58) Field of Classification Search
CPC ... H02J 50/001; H02J 50/80; H04W 72/0446; H04W 72/51
See application file for complete search history.

(56) References Cited

U.S. PATENT DOCUMENTS

2019/0045507 A1* 2/2019 Sorrentino ........ H04W 72/1268
2019/0208408 A1* 7/2019 Frenne .................. H04W 76/27
2022/0014333 A1* 1/2022 Bhamri ................. H04L 5/0094
2022/0070836 A1* 3/2022 Balasubramanian ... H02J 50/20
2024/0098648 A1* 3/2024 Tayyab ............. H04W 52/0258
2025/0126565 A1* 4/2025 Wei ......................... H02J 50/20
2026/0067810 A1* 3/2026 Hathiramani ..... H04W 52/0229

* cited by examiner

*Primary Examiner* — Thomas R Cairns
*Assistant Examiner* — Raenita Ann Fenner
(74) *Attorney, Agent, or Firm* — Holland & Hart LLP

(57) ABSTRACT

Methods, systems, and devices for wireless communication are described. The method may include an energy harvesting (EH) device receiving a first control signal that includes scheduling information for the EH device. The scheduling information may indicate a first set of resources for communicating a first signal and a first offset between receiving the first control signal and communicating the first signal. Further, the method may include transmitting, via a second set of resources, a second signal indicating a second offset between receiving the first control signal and communicating the first signal and communicating the first signal via the first set of resources based on the second offset.

28 Claims, 18 Drawing Sheets

| Bits | Offset 320-a | Offset 320-b | Offset 320-c |
|---|---|---|---|
| 00 | $X_0$ | $Y_0$ | $Z_0$ |
| 01 | $X_1$ | $Y_1$ | $Z_1$ |
| 10 | $X_2$ | $Y_2$ | $Z_2$ |
| 11 | $X_3$ | $Y_3$ | $Z_3$ |

ADAPTIVE ALLOCATION TIMING FOR ENERGY HARVESTING DEVICES

TECHNICAL FIELD

The following relates generally to wireless communications, and more specifically to adaptive allocation timing for energy harvesting (EH) devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A wireless communications system may support energy harvesting (EH) devices. EH devices may be described as wireless devices that operate using energy harvested from external sources (e.g., from radio frequency, thermal, or solar sources). A communication device (e.g., a network entity, a base station, or a UE) of the wireless communications system may schedule an EH device to communicate with one or more other communication devices. However, in some cases, the communication device might not consider the EH capability of the EH device when scheduling the EH device.

SUMMARY

The described techniques relate to improved methods, systems, devices, and apparatuses that support adaptive allocation timing for energy harvesting (EH) devices. For example, the described techniques provide for an EH device to inform a communication device (e.g., a scheduling node, such as a network entity, a base station, or a UE) of an EH capability of the EH device, such that the communication device may appropriately schedule the EH device for communications. For example, the method as described herein may include the EH device receiving a control signal indicating scheduling information that identifies a set of resources (e.g., time and frequency resources) for communicating a first signal and an offset between receiving the control signal and communicating the first signal. The EH device may additionally, or alternatively, transmit a second signal that indicates a second offset between receiving the control signal and communicating the first signal. In some examples, the EH device may determine the second offset based on the EH capability of the EH device. The EH device may thereby communicate the first signal using the set of resources based on the second offset (e.g., during a duration that occurs after the second offset).

A method for wireless communication at an EH device is described. The method may include receiving a first control signal that includes scheduling information for the EH device, the scheduling information indicating a first set of resources for communicating a first signal and a first offset between receiving the first control signal and communicating the first signal, transmitting, via a second set of resources, a second signal indicating a second offset between receiving the first control signal and communicating the first signal, and communicating the first signal via the first set of resources based on the second offset.

An apparatus for wireless communication at an EH device is described. The apparatus may include at least one processor and memory coupled with the at least one processor. The memory may store instructions for the at least one processor to cause the EH device to receive a first control signal that includes scheduling information for the EH device, the scheduling information indicating a first set of resources for communicating a first signal and a first offset between receiving the first control signal and communicating the first signal, transmit, via a second set of resources, a second signal indicating a second offset between receiving the first control signal and communicating the first signal, and communicate the first signal via the first set of resources based on the second offset.

Another apparatus for wireless communication at an EH device is described. The apparatus may include means for receiving a first control signal that includes scheduling information for the EH device, the scheduling information indicating a first set of resources for communicating a first signal and a first offset between receiving the first control signal and communicating the first signal, means for transmitting, via a second set of resources, a second signal indicating a second offset between receiving the first control signal and communicating the first signal, and means for communicating the first signal via the first set of resources based on the second offset.

A non-transitory computer-readable medium storing code for wireless communication at an EH device is described. The code may include instructions executable by at least one processor to receive a first control signal that includes scheduling information for the EH device, the scheduling information indicating a first set of resources for communicating a first signal and a first offset between receiving the first control signal and communicating the first signal, transmit, via a second set of resources, a second signal indicating a second offset between receiving the first control signal and communicating the first signal, and communicate the first signal via the first set of resources based on the second offset.

Some examples of the method, apparatuses, and non-transitory computer-readable medium described herein may further include operations, features, means, or instructions for transmitting the second signal during at least a portion of the first offset.

Some examples of the method, apparatuses, and non-transitory computer-readable medium described herein may further include operations, features, means, or instructions for selecting the second offset from a set of multiple second offsets, where each of the set of multiple second offsets corresponds to a respective combination of a start and length indicator and a channel type.

Some examples of the method, apparatuses, and non-transitory computer-readable medium described herein may further include operations, features, means, or instructions for receiving a second control signal indicating the set of multiple second offsets.

Some examples of the method, apparatuses, and non-transitory computer-readable medium described herein may further include operations, features, means, or instructions for receiving a second control signal, the second control signal activating a set of multiple periodic communication occasions, where transmitting the second signal occurs during a periodic communication occasion of the set of multiple periodic communication occasions.

In some examples of the method, apparatuses, and non-transitory computer-readable medium described herein, the first control signal further includes a third set of resources for transmitting the second signal.

Some examples of the method, apparatuses, and non-transitory computer-readable medium described herein may further include operations, features, means, or instructions for transmitting, during a third offset that may be after the second offset, a third signal via a third set of resources.

Some examples of the method, apparatuses, and non-transitory computer-readable medium described herein may further include operations, features, means, or instructions for receiving a second control signal indicating an enabled state or a disabled state, where transmitting the third signal during the third set of resources may be based on the second control signal indicating the enabled state.

In some examples of the method, apparatuses, and non-transitory computer-readable medium described herein, receiving the second control signal may include operations, features, means, or instructions for receiving control information, where the indication of the enabled state or the disabled state may be based on a value of one or more fields of the control information.

Some examples of the method, apparatuses, and non-transitory computer-readable medium described herein may further include operations, features, means, or instructions for receiving a third control signal indicating the third offset.

Some examples of the method, apparatuses, and non-transitory computer-readable medium described herein may further include operations, features, means, or instructions for transmitting an acknowledgment (ACK) message associated with the first control signal and initiating a timer based on transmitting the ACK message, where a duration of the timer includes the second offset, and where the first signal may be communicated upon expiration of the timer.

In some examples of the method, apparatuses, and non-transitory computer-readable medium described herein, the first control signal further includes scheduling information for communicating a set of channels and the method, apparatuses, and non-transitory computer-readable medium may include further operations, features, means, or instructions for communicating a subset of the set of channels.

In some examples of the method, apparatuses, and non-transitory computer-readable medium described herein, transmitting the second signal may include operations, features, means, or instructions for transmitting the second signal prior to receiving the first control signal, where the first offset may be equal to the second offset. In some examples of the method, apparatuses, and non-transitory computer-readable medium described herein, the first offset may be different from the second offset.

In some examples of the method, apparatuses, and non-transitory computer-readable medium described herein, the second offset may be an offset with respect to the first offset. In some examples of the method, apparatuses, and non-transitory computer-readable medium described herein, the first offset includes a first duration between receiving the first control signal and communicating the first signal and the second offset includes a second duration between receiving the first control signal and communicating the first signal.

Some examples of the method, apparatuses, and non-transitory computer-readable medium described herein may further include operations, features, means, or instructions for determining energy status information associated with the EH device, where the second offset may be based on the energy status information.

In some examples of the method, apparatuses, and non-transitory computer-readable medium described herein, the energy status information may be based on an amount of power harvested by the EH device, an amount of power to process reference signals at the EH device, an amount of power to process data signals at the EH device, an amount of power to process control signals at the EH device, a battery leakage associated with the EH device, a battery size associated with the EH device, a time to turn on hardware associated with the EH device, a time to harvest power, or a combination thereof.

In some examples of the method, apparatuses, and non-transitory computer-readable medium described herein, communicating the first signal may include operations, features, means, or instructions for transmitting the first signal via the first set of resources.

In some examples of the method, apparatuses, and non-transitory computer-readable medium described herein, communicating the first signal may include operations, features, means, or instructions for receiving the first signal via the first set of resources.

A method for wireless communication at a network entity is described. The method may include transmitting a first control signal that includes scheduling information for an EH device, the scheduling information indicating a first set of resources for communicating a first signal and a first offset between receiving the first control signal and communicating the first signal, receiving, via a second set of resources, a second signal indicating a second offset between receiving the first control signal and communicating the first signal, and communicating the first signal via the first set of resources based on the second offset.

An apparatus for wireless communication at a network entity is described. The apparatus may include at least one processor and memory coupled with the at least one processor. The memory may store instructions for the at least one processor to cause the network entity to transmit a first control signal that includes scheduling information for an EH device, the scheduling information indicating a first set of resources for communicating a first signal and a first offset between receiving the first control signal and communicating the first signal, receive, via a second set of resources, a second signal indicating a second offset between receiving the first control signal and communicating the first signal, and communicate the first signal via the first set of resources based on the second offset.

Another apparatus for wireless communication at a network entity is described. The apparatus may include means for transmitting a first control signal that includes scheduling information for an EH device, the scheduling information indicating a first set of resources for communicating a first signal and a first offset between receiving the first control signal and communicating the first signal, means for receiving, via a second set of resources, a second signal indicating a second offset between receiving the first control signal and communicating the first signal, and means for communicating the first signal via the first set of resources based on the second offset.

A non-transitory computer-readable medium storing code for wireless communication at a network entity is described. The code may include instructions executable by at least one processor to transmit a first control signal that includes scheduling information for an EH device, the scheduling information indicating a first set of resources for communicating a first signal and a first offset between receiving the first control signal and communicating the first signal, receive, via a second set of resources, a second signal indicating a second offset between receiving the first control signal and communicating the first signal, and communicate the first signal via the first set of resources based on the second offset.

Some examples of the method, apparatuses, and non-transitory computer-readable medium described herein may further include operations, features, means, or instructions for receiving the second signal during at least a portion of the first offset.

Some examples of the method, apparatuses, and non-transitory computer-readable medium described herein may further include operations, features, means, or instructions for transmitting a second control signal indicating a set of multiple second offsets.

Some examples of the method, apparatuses, and non-transitory computer-readable medium described herein may further include operations, features, means, or instructions for transmitting a second control signal, the second control signal activating a set of multiple periodic communication occasions, where receiving the second signal occurs during a periodic communication occasion of the set of multiple periodic communication occasions.

In some examples of the method, apparatuses, and non-transitory computer-readable medium described herein, the first control signal further includes a third set of resources for transmitting the second signal.

Some examples of the method, apparatuses, and non-transitory computer-readable medium described herein may further include operations, features, means, or instructions for receiving, during a third offset that may be after the second offset, a third signal via a third set of resources.

Some examples of the method, apparatuses, and non-transitory computer-readable medium described herein may further include operations, features, means, or instructions for transmitting a second control signal indicating an enabled state or a disabled state, where receiving the third signal during the third set of resources may be based on the second control signal indicating the enabled state.

In some examples of the method, apparatuses, and non-transitory computer-readable medium described herein, transmitting the second control signal may include operations, features, means, or instructions for transmitting control information, where the indication of the enabled state or the disabled state may be based on a value of one or more fields of the control information.

Some examples of the method, apparatuses, and non-transitory computer-readable medium described herein may further include operations, features, means, or instructions for transmitting a third control signal indicating the third offset.

Some examples of the method, apparatuses, and non-transitory computer-readable medium described herein may further include operations, features, means, or instructions for receiving an ACK message associated with the first control signal and initiating a timer based on receiving the ACK message, where a duration of the timer includes the second offset, and where the first signal may be communicated upon expiration of the timer.

In some examples of the method, apparatuses, and non-transitory computer-readable medium described herein, receiving the second signal may include operations, features, means, or instructions for receiving the second signal prior to receiving the first control signal, where the first offset may be equal to the second offset. In some examples of the method, apparatuses, and non-transitory computer-readable medium described herein, the first offset may be different from the second offset.

In some examples of the method, apparatuses, and non-transitory computer-readable medium described herein, the second offset may be an offset with respect to the first offset. In some examples of the method, apparatuses, and non-transitory computer-readable medium described herein, the first offset includes a first number of time units between a time unit used for transmitting the first control signal and a time unit for communicating the first signal and the second offset includes a second number of time units between the time unit used for transmitting the first control signal and the time unit for communicating the first signal.

In some examples of the method, apparatuses, and non-transitory computer-readable medium described herein, the second offset may be based on energy status information associated with the EH device and the energy status information may be based on an amount of power harvested by the EH device, an amount of power to process reference signals at the EH device, an amount of power to process data signals at the EH device, an amount of power to process control signals at the EH device, a battery leakage associated with the EH device, a battery size associated with the EH device, a time to turn on hardware associated with the EH device, a time to harvest power, or a combination thereof.

In some examples of the method, apparatuses, and non-transitory computer-readable medium described herein, communicating the first signal may include operations, features, means, or instructions for transmitting the first signal via the first set of resources.

In some examples of the method, apparatuses, and non-transitory computer-readable medium described herein, communicating the first signal may include operations, features, means, or instructions for receiving the first signal via the first set of resources.

A method for wireless communication at an EH device is described. The method may include receiving a first control signal that includes scheduling information for the EH device, the scheduling information indicating a first set of resources for communicating a first signal and a first offset between receiving the first control signal and communicating the first signal, transmitting, via a second set of resources, a second signal indicating a second offset between receiving the first control signal and communicating the first signal, and communicating the first signal via the first set of resources based on the second offset.

An apparatus for wireless communication at an EH device is described. The apparatus may include at least one processor and memory coupled with the at least one processor. The memory storing instructions for the at least one processor to cause the EH device to receive a first control signal that includes scheduling information for the EH device, the scheduling information indicating a first set of resources for communicating a first signal and a first offset between receiving the first control signal and communicating the first signal, transmit, via a second set of resources, a second signal indicating a second offset between receiving the first control signal and communicating the first signal, and communicate the first signal via the first set of resources based on the second offset.

Another apparatus for wireless communication at an EH device is described. The apparatus may include means for receiving a first control signal that includes scheduling information for the EH device, the scheduling information indicating a first set of resources for communicating a first signal and a first offset between receiving the first control signal and communicating the first signal, means for transmitting, via a second set of resources, a second signal indicating a second offset between receiving the first control signal and communicating the first signal, and means for communicating the first signal via the first set of resources based on the second offset.

A non-transitory computer-readable medium storing code for wireless communication at an EH device is described. The code may include instructions executable by at least one processor to receive a first control signal that includes scheduling information for the EH device, the scheduling information indicating a first set of resources for communicating a first signal and a first offset between receiving the first control signal and communicating the first signal, transmit, via a second set of resources, a second signal indicating a second offset between receiving the first control signal and communicating the first signal, and communicate the first signal via the first set of resources based on the second offset.

Some examples of the method, apparatuses, and non-transitory computer-readable medium described herein may further include operations, features, means, or instructions for transmitting the second signal during at least a portion of the first offset.

Some examples of the method, apparatuses, and non-transitory computer-readable medium described herein may further include operations, features, means, or instructions for selecting the second offset from a set of multiple second offsets, where each of the set of multiple second offsets corresponds to a respective combination of a start and length indicator and a channel type.

Some examples of the method, apparatuses, and non-transitory computer-readable medium described herein may further include operations, features, means, or instructions for receiving a second control signal indicating the set of multiple second offsets.

Some examples of the method, apparatuses, and non-transitory computer-readable medium described herein may further include operations, features, means, or instructions for receiving a second control signal, the second control signal activating a set of multiple periodic communication occasions, where transmitting the second signal occurs during a periodic communication occasion of the set of multiple periodic communication occasions.

In some examples of the method, apparatuses, and non-transitory computer-readable medium described herein, the first control signal further includes a third set of resources for transmitting the second signal.

Some examples of the method, apparatuses, and non-transitory computer-readable medium described herein may further include operations, features, means, or instructions for transmitting, during a third offset that may be after the second offset, a third signal via a third set of resources.

Some examples of the method, apparatuses, and non-transitory computer-readable medium described herein may further include operations, features, means, or instructions for receiving a second control signal indicating an enabled state or a disabled state, where transmitting the third signal during the third set of resources may be based on the second control signal indicating the enabled state.

In some examples of the method, apparatuses, and non-transitory computer-readable medium described herein, receiving the second control signal may include operations, features, means, or instructions for receiving control information, where the indication of the enabled state or the disabled state may be based on a value of one or more fields of the control information.

Some examples of the method, apparatuses, and non-transitory computer-readable medium described herein may further include operations, features, means, or instructions for receiving a third control signal indicating the third offset.

Some examples of the method, apparatuses, and non-transitory computer-readable medium described herein may further include operations, features, means, or instructions for transmitting an acknowledgment (ACK) message associated with the first control signal and initiating a timer based on transmitting the ACK message, where a duration of the timer includes the second offset, and where the first signal may be communicated upon expiration of the timer.

In some examples of the method, apparatuses, and non-transitory computer-readable medium described herein, the first control signal further includes scheduling information for communicating a set of channels and the method, apparatuses, and non-transitory computer-readable medium may include further operations, features, means, or instructions for communicating a subset of the set of channels.

In some examples of the method, apparatuses, and non-transitory computer-readable medium described herein, transmitting the second signal may include operations, features, means, or instructions for transmitting the second signal prior to receiving the first control signal, where the first offset may be equal to the second offset. In some examples of the method, apparatuses, and non-transitory computer-readable medium described herein, the first offset may be different from the second offset.

In some examples of the method, apparatuses, and non-transitory computer-readable medium described herein, the second offset may be an offset with respect to the first offset. In some examples of the method, apparatuses, and non-transitory computer-readable medium described herein, the first offset includes a first duration between receiving the first control signal and communicating the first signal and the second offset includes a second duration between receiving the first control signal and communicating the first signal.

Some examples of the method, apparatuses, and non-transitory computer-readable medium described herein may further include operations, features, means, or instructions for determining energy status information associated with the EH device, where the second offset may be based on the energy status information.

In some examples of the method, apparatuses, and non-transitory computer-readable medium described herein, the energy status information may be based on an amount of power harvested by the EH device, an amount of power to process reference signals at the EH device, an amount of power to process data signals at the EH device, an amount of power to process control signals at the EH device, a battery leakage associated with the EH device, a battery size associated with the EH device, a time to turn on hardware associated with the EH device, a time to harvest power, or a combination thereof.

In some examples of the method, apparatuses, and non-transitory computer-readable medium described herein, communicating the first signal may include operations, features, means, or instructions for transmitting the first signal via the first set of resources.

In some examples of the method, apparatuses, and non-transitory computer-readable medium described herein, communicating the first signal may include operations, features, means, or instructions for receiving the first signal via the first set of resources.

A method for wireless communication at a network entity is described. The method may include transmitting a first control signal that includes scheduling information for an EH device, the scheduling information indicating a first set of resources for communicating a first signal and a first offset between receiving the first control signal and communicating the first signal, receiving, via a second set of resources, a second signal indicating a second offset between receiving the first control signal and communicating the first signal, and communicating the first signal via the first set of resources based on the second offset.

An apparatus for wireless communication at a network entity is described. The apparatus may include at least one processor and memory coupled with the at least one processor. The memory storing instructions for the at least one processor to cause the network entity to transmit a first control signal that includes scheduling information for an EH device, the scheduling information indicating a first set of resources for communicating a first signal and a first offset between receiving the first control signal and communicating the first signal, receive, via a second set of resources, a second signal indicating a second offset between receiving the first control signal and communicating the first signal, and communicate the first signal via the first set of resources based on the second offset.

Another apparatus for wireless communication at a network entity is described. The apparatus may include means for transmitting a first control signal that includes scheduling information for an EH device, the scheduling information indicating a first set of resources for communicating a first signal and a first offset between receiving the first control signal and communicating the first signal, means for receiving, via a second set of resources, a second signal indicating a second offset between receiving the first control signal and communicating the first signal, and means for communicating the first signal via the first set of resources based on the second offset.

A non-transitory computer-readable medium storing code for wireless communication at a network entity is described. The code may include instructions executable by at least one processor to transmit a first control signal that includes scheduling information for an EH device, the scheduling information indicating a first set of resources for communicating a first signal and a first offset between receiving the first control signal and communicating the first signal, receive, via a second set of resources, a second signal indicating a second offset between receiving the first control signal and communicating the first signal, and communicate the first signal via the first set of resources based on the second offset.

Some examples of the method, apparatuses, and non-transitory computer-readable medium described herein may further include operations, features, means, or instructions for receiving the second signal during at least a portion of the first offset.

Some examples of the method, apparatuses, and non-transitory computer-readable medium described herein may further include operations, features, means, or instructions for transmitting a second control signal indicating a set of multiple second offsets.

Some examples of the method, apparatuses, and non-transitory computer-readable medium described herein may further include operations, features, means, or instructions for transmitting a second control signal, the second control signal activating a set of multiple periodic communication occasions, where receiving the second signal occurs during a periodic communication occasion of the set of multiple periodic communication occasions.

In some examples of the method, apparatuses, and non-transitory computer-readable medium described herein, the first control signal further includes a third set of resources for transmitting the second signal.

Some examples of the method, apparatuses, and non-transitory computer-readable medium described herein may further include operations, features, means, or instructions for receiving, during a third offset that may be after the second offset, a third signal via a third set of resources.

Some examples of the method, apparatuses, and non-transitory computer-readable medium described herein may further include operations, features, means, or instructions for transmitting a second control signal indicating an enabled state or a disabled state, where receiving the third signal during the third set of resources may be based on the second control signal indicating the enabled state.

In some examples of the method, apparatuses, and non-transitory computer-readable medium described herein, transmitting the second control signal may include operations, features, means, or instructions for transmitting control information, where the indication of the enabled state or the disabled state may be based on a value of one or more fields of the control information.

Some examples of the method, apparatuses, and non-transitory computer-readable medium described herein may further include operations, features, means, or instructions for transmitting a third control signal indicating the third offset.

Some examples of the method, apparatuses, and non-transitory computer-readable medium described herein may further include operations, features, means, or instructions for receiving an ACK message associated with the first control signal and initiating a timer based on receiving the ACK message, where a duration of the timer includes the second offset, and where the first signal may be communicated upon expiration of the timer.

In some examples of the method, apparatuses, and non-transitory computer-readable medium described herein, receiving the second signal may include operations, features, means, or instructions for receiving the second signal prior to receiving the first control signal, where the first offset may be equal to the second offset. In some examples of the method, apparatuses, and non-transitory computer-readable medium described herein, the first offset may be different from the second offset.

In some examples of the method, apparatuses, and non-transitory computer-readable medium described herein, the second offset may be an offset with respect to the first offset. In some examples of the method, apparatuses, and non-transitory computer-readable medium described herein, the first offset includes a first number of time units (e.g., subsymbol, symbols, slots, subslots, bundle/group of slots, etc.) between a time unit used for transmitting the first control signal and a time unit for communicating the first signal and the second offset includes a second number of time units (e.g., subsymbol, symbols, slots, subslots, bundle/group of slots, etc.) between the time unit used for transmitting the first control signal and the time unit for communicating the first signal.

In some examples of the method, apparatuses, and non-transitory computer-readable medium described herein, the second offset may be based on energy status information associated with the EH device and the energy status information may be based on an amount of power harvested by the EH device, an amount of power to process reference signals at the EH device, an amount of power to process data signals at the EH device, an amount of power to process control signals at the EH device, a battery leakage associated with the EH device, a battery size associated with the EH device, a time to turn on hardware associated with the EH device, a time to harvest power, or a combination thereof.

In some examples of the method, apparatuses, and non-transitory computer-readable medium described herein, communicating the first signal may include operations, features, means, or instructions for transmitting the first signal via the first set of resources.

In some examples of the method, apparatuses, and non-transitory computer-readable medium described herein, communicating the first signal may include operations, features, means, or instructions for receiving the first signal via the first set of resources.

BRIEF DESCRIPTION OF THE DRAWINGS

FIG. 3 illustrates an example of a table that supports adaptive allocation timing for EH devices in accordance with one or more aspects of the present disclosure.

DETAILED DESCRIPTION

Figure 1:
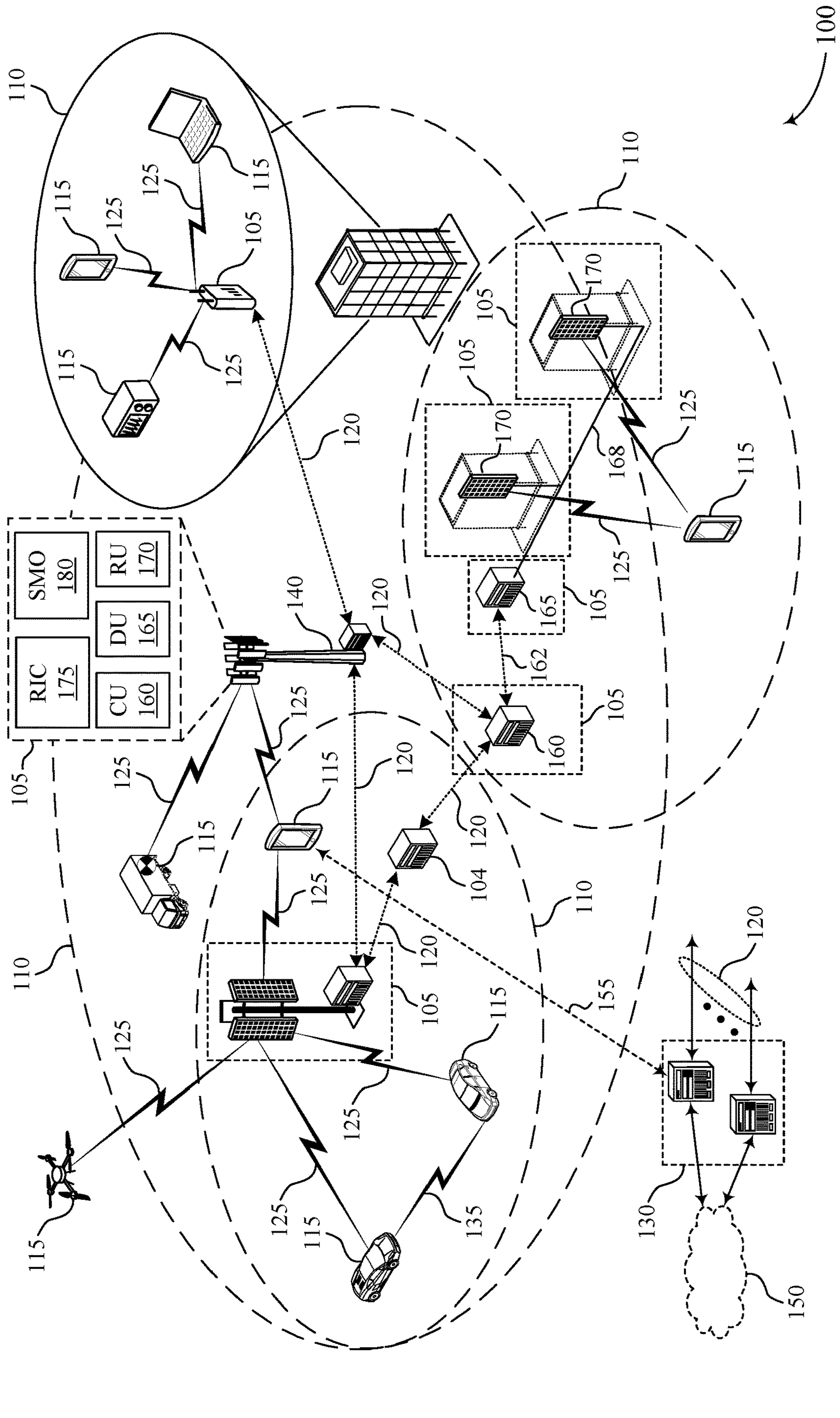
FIGS. 1 and 2 illustrate examples of a wireless communications system that supports adaptive allocation timing for energy harvesting (EH) devices in accordance with one or more aspects of the present disclosure.

A wireless communications system may include energy harvesting (EH) devices. An EH device may be configured to operate in accordance with power harvested from external energy sources, such as radio frequency energy, solar energy, thermal energy, or vibrational energy. Some examples of EH devices may include, but is not limited to, tracking devices (e.g., security tags or smart tracking labels) or sensors (e.g., temperature sensors, humidity sensors, or pressure sensors). An active cycle for an EH device (e.g., an active period and an inactive period for the EH device) may be based on a power consumption of the EH device over a first time and a power harvested by the harvesting device over a second time.

Prior to each active period, the EH device may enter an inactive period such that the EH device may accumulate power to use for communication during the subsequent active period. During the active period, the EH device may receive control information from a network entity. The control information may indicate a set of resources for communicating a signal and additionally, indicate an offset. The offset value may indicate a duration (e.g., a number of slots or symbols) between receiving the control information and communicating the signal. The network entity may determine the offset based on device capabilities of a wireless devices being scheduled. However, in some cases, an EH device may have different (or more constrained) capabilities when compared to other wireless devices. For example, the EH device may require extra time (e.g., a greater offset), such that the EH device may harvest sufficient energy for communication of the signal scheduled by the control information. It may be beneficial for the offset to be configured (e.g., allocated, assigned, determined) to the EH device, for example, based on the EH capabilities of the EH device.

As described herein, the EH device may dynamically indicate an offset to the network entity. In some examples, the EH device may determine a first offset. The EH device may determine the first offset based on energy status information associated with the EH device. The energy status information may include power consumed by the EH device over a first time, power harvested by the EH device over a second time, or expected power to be consumed by a resource allocation scheduled by control information. The EH device may signal the determined first offset to the network entity. The EH device may signal the first offset prior to or after receiving control information. If the EH device signals the first offset to the network entity prior to receiving the control information, the network entity may utilize the first offset to determine a second offset to include in the control information.

Alternatively, if the EH device signals the first offset after receiving the control information, the EH device may signal a difference between the first offset and the second offset value included in the control information (e.g., a difference between the first offset and the second offset). In some examples, the EH device may select the first offset from a set of first offsets included in a configuration, for example, a data structure, such as a table (e.g., a time domain resource allocation (TDRA) table). The EH may transmit the indication of the first offset to the network entity via a set of resources. In one example, the network entity may schedule the EH device to transmit the indication of the first offset using a configured grant (CG). In another example, the EH device may autonomously select the set of resources for transmission of the indication of the first offset. The methods as described herein may allow an EH device to be scheduled based on EH capabilities of the EH device, and as a result may improve coordination between devices of the wireless communication system and potentially reduce signaling overhead.

Aspects of the disclosure are initially described in the context of wireless communications systems. Additional aspects are described in the context of a table, frame layouts, and a process flow. Aspects of the disclosure are further illustrated by and described with reference to apparatus diagrams, system diagrams, and flowcharts that relate to adaptive allocation timing for EH devices.

FIG. 1 illustrates an example of a wireless communications system 100 that supports adaptive allocation timing for EH devices in accordance with one or more aspects of the present disclosure. The wireless communications system 100 may include one or more network entities 105, one or more UEs 115, and a core network 130. In some examples, the wireless communications system 100 may be an LTE network, an LTE-A network, an LTE-A Pro network, an NR network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, or computing system may include disclosure of the UE 115, network entity 105, apparatus, device, or computing system being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

In some examples, the UE 115 may use a Uu interface for communications (e.g., PUSCH or PDSCH) with a network entity 105. Additionally or alternatively, the UE 115 may use a PC5 interface or other interface for communications (e.g., PSSCH) with another UE 115. Additionally or alternatively, an EH UE 115 may utilize an EH interface (e.g., an interface different from the Uu interface or the PC5 interface) for communication (e.g., communications related to EH) with a node (e.g., the core network 130, another UE 115, the network entity 105, or the base station 140).

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU

170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support adaptive allocation timing for EH devices as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

As described herein, the UE 115 may be an example of an EH device and may inform the network entity 105 of its EH capability such that the network entity 105 may appropriately schedule the UE 115 for communications. For example, the method as described herein may include the UE 115 receiving a control signal from the network entity 105. The control signal may include scheduling information that indicates a set of resources for communicating a first signal and an offset between receiving the control signal and communicating the first signal. Further, the UE 115 may transmit a second signal that indicates a second offset between receiving the control signal and communicating the first signal. In some examples, the UE 115 may determine the second offset based on an EH capability of the UE 115. Moreover, the UE 115 may communicate the first signal via the set of resources based on the second offset (e.g., during a duration that occurs after the second offset).

Figure 2:
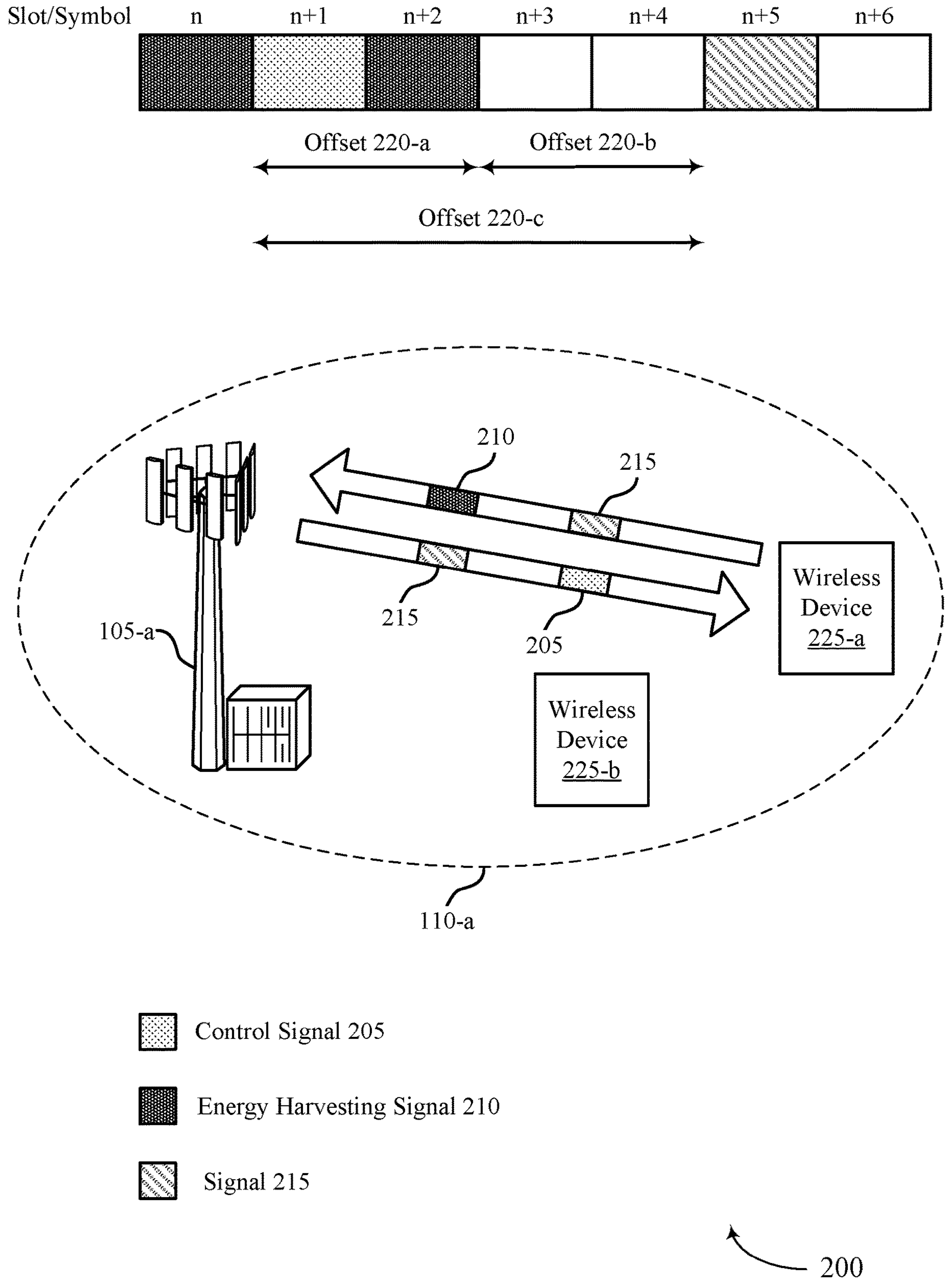

FIG. 2 illustrates an example of a wireless communications system 200 that supports adaptive allocation timing for EH devices in accordance with one or more aspects of the present disclosure. In some examples, the wireless communications system 200 may implement aspects of the wireless communications system 100. For example, the wireless communications system 200 may include a network entity 105-*a*, which may be an example of a network entity 105. The wireless communications system 200 may also include a wireless device 225-*a* and a wireless device 225-*b*, which may be examples of UEs 115 as described with reference to FIG. 1. In some examples, the wireless device 225-*a* and the wireless device 225-*b* may be located in a coverage area 110-*a* of the network entity 105-*a* and the network entity 105-*a* may establish communication links with the wireless device 225-*a* and the wireless device 225-*b*.

The wireless device 225-*a* may be an example of an EH device. EH devices may derive energy from one or more external energy sources (e.g., radio frequency, light, magnetism, thermoelectric, or vibration) and utilize the derived energy to communicate with other devices. In some examples, EH devices may include a battery or a capacitor to store the derived energy. Alternatively, the energy harvesting device may be battery-less. Examples of EH devices may include passive IoT devices, such as sensors (e.g., accelerometers, pressure sensors, humidity sensors, light sensors, vibration sensor, or gas sensors) or positioning devices. In some cases, the EH devices may be used for machine health monitoring, product security, or product tracking.

In order to harvest energy, the wireless device 225-*a* may support discontinuous reception (DRX) or discontinuous transmission (DTX). That is, the wireless device 225-*a* may be asleep or awake during different time periods. For example, during a first time period, the wireless device 225-*a* may be asleep (e.g., operating in a low power mode) and during a second time period, the wireless device 225-*a* may be awake. While the wireless device 225-*a* is asleep, the wireless device 225-*a* may harvest energy and while the wireless device 225-*a* is awake, the wireless device 225-*a* may communicate with one or more other devices (e.g., the wireless device 225-*b* or the network entity 105-*a*). As such, the time period for which the wireless device 225-*a* is asleep or awake may depend on an EH profile of the wireless device 225-*a*.

An EH profile of a wireless device 225-*a* may consider an amount of energy (e.g., $P_x$) that the wireless device 225-*a* gains through harvesting over time (e.g., X) and an amount of energy (e.g., $P_y$) that the wireless device 225-*a* consumes while communicating over time (e.g., Y). In some examples, a constraint of the wireless device 225-*a* may be that the harvested energy harvested by the wireless device 225-*a* may be higher than or equal to the energy consumed by the wireless device 225-*a* that may be represented by Equation (1). In Equation (1), $\eta_x$ may represent the efficiency of the EH procedure performed by the wireless device 225-*a*. Thus, the wireless device 225-*a* may determine a sleep duration (e.g., harvesting duration, OFF duration, or X) and an awake duration (e.g., ON duration or Y) using Equation (1).

$$P_x \times \eta_x \times X \geq P_y \times Y \tag{1}$$

The wireless device 225-*a* may consume power during the awake duration by performing one or more communication operations. The one or more communication operations may include processing a demodulation reference signal (DMRS) signal, processing a low density parity check (LDPC)-coded data signal, processing a polar-coded information signal, processing a sequence-based control signal, processing a synchronization signal block (SSB), processing a channel state information reference signal (CSI-RS), processing the data, processing of a physical downlink control channel (PDCCH), and processing a physical uplink control channel (PUCCH). Power consumption at the wireless device 225-*a* may be due to battery leakage at the wireless device 225-*a*. In some examples, the wireless device 225-*a* may calculate a power consumed by the wireless device 225-*a* to perform one or more of the above examples of a communication operation (e.g., per resource block (RB), resource element (RE), or any size of frequency/time block) and transmit an indication of the power consumed by the wireless device 225-*a* to perform each communication operation to the network entity 105-*a*. In some examples, one or both of the wireless device 225-*a* and the network entity 105-*a* may determine a power model (e.g., power capability) for the wireless device 225-*a* based on the power consumption indication. Using the power control model, the network entity 105-*a* or the wireless device 225-*a* may adjust reception parameters or transmission parameters (e.g., uplink transmission power) at the wireless device 225-*a* or adjust the EH procedure at the wireless device 225-*a*.

The power model for the wireless device 225-*a* may depend on an EH class of the wireless device 225-*a*. Wireless devices of a same EH class may have one or more same or similar EH characteristics. For example, the wireless devices 225 of a same EH class may harvest energy in the same way (e.g., perform a same EH procedure) or obtain similar information or data (e.g., the wireless devices 225 may be sensors configured to measure or sense vibration). As one example, the wireless device 225-*a* may be associated with a first EH class and the wireless device 225-*b* may be associated with a second EH class. In some examples, the wireless devices 225 may signal their respective EH class to the network entity 105-*a*.

During the one or more durations that the wireless device 225-*a* is awake, the wireless device 225-*a* may receive or transmit signaling to a different device (e.g., the network entity 105-*a* or the wireless device 225-*b*). For example, while the wireless device 225-*a* is awake, the wireless device 225-*a* may receive a control signal 205 during the slot or symbol n+1. The control signal 205 may be an example of downlink control information (DCI) scheduling a subsequent uplink or downlink transmission for the wireless device 225-*a*. The wireless device 225-*a* may determine when to receive or transmit a signal scheduled by the control signal 205 using an offset 220-*a*. The offset 220-*a* may indicate a time period between receiving the control signal 205 and communicating the signal scheduled by the control signal 205. For example, the offset 220-*a* may include a K2 value. K2 may indicate a quantity of slots between a slot used to receive the control signal 205 and a slot used to transmit of receive an uplink signal (e.g., physical uplink shared channel (PUSCH)) scheduled by the control signal 205. In some example, a window of time may be associated with a set of occasions (e.g., subsymbol, symbols, slots, subslots, bundle/group of slots, etc.) for transmitting the uplink signal (e.g., a PUSCH) when there is sufficient energy harvested at the wireless device 225-*a* (e.g., a UE). Alternatively, the offset 220-*a* may include a K0 value. K0 may indicate a quantity of slots between a slot used to receive the control signal 205 and a slot used to transmit of receive a downlink signal (e.g., physical downlink shared channel (PDSCH)) scheduled by the control signal 205. Alternatively, the offset 220-*a* may indicate quantity of symbols between a symbol used to receive the control signal 205 and a symbol used to receive or transmit a reference signal (e.g., CSI-RS) scheduled by the control signal 205.

In some examples, an indication of the offset value 220-*a* may be indicated to the wireless device via the control signal 205. For example, the control signal 205 may include a time domain resource allocation (TDRA) index value. The index value may point to a specific row of a TDRA table and the TDRA row may include the offset value 220-*a* along with other values (e.g., a first symbol in a slot that the signal scheduled by the control signal 205 will be communicated or a number of consecutive symbols that is allocated for the signal scheduled by the control signal 205). In some examples, the wireless device 225-*a* may receive the TDRA table via RRC signaling.

In the example of FIG. 2, the wireless device 225-*a* may receive the control signal 205 in slot or symbol n+1. The control signal may indicate the offset 220-*a* and the offset 220-*a* may include an offset of 2 (e.g., 2 symbols or slots). As such, the wireless device 225-*a* may communicate (e.g., transmit or receive) the signal scheduled by the control signal 205 during slot n+3. However, in some examples, the network entity 105-*a* might not consider an EH capability of the wireless device 225-*a* when determining the offset 220-*a*. The network entity 105-*a* may instead consider other capabilities (e.g., a processing capability) of the wireless device 225-*a*.

Unlike full-capability wireless devices 225 (e.g., non-EH devices), the wireless device 225-*a* may need time to harvest energy prior to communicating the signal scheduled by the control signal 205 or the wireless device 225-*a* may need time to activate (or turn 'ON') one or more components (e.g., hardware associated with transmission or reception of signals at the wireless device 225-*a*). Without considering the EH capability of the wireless device 225-*a*, the network entity 105-*a* may provide the wireless device 225-*a* with an inadequate offset 220-*a*. That is, the offset 220-*a* may not provide the wireless device 225-*a* with enough time to harvest energy for communication of the signal scheduled by control signal 205 or the enough time to activate the one or more components. If the wireless device 225-*a* does not have enough energy to communicate the signal, the wireless device 225-*a* may not communicate the signal and the network entity 105-*a* may reschedule the signal using a second control signal which may increase signaling overhead and decrease efficiency.

As described herein, the wireless device 225-*a* may determine an offset 220 between receiving a control signal 205 and communicating the signal scheduled by the control signal 205 based on EH capability of the wireless device 225-*a*. In some examples, the wireless device 225-*a* may consider the power control model of the wireless device 225-*a* or the EH class of the wireless device 225-*a* when determining the offset 220. Further, the wireless device 225-*a* may transmit an indication of the offset 220 to the network entity 105-*a*. For example, the wireless device 225-*a* may transmit an EH signal 210 indicating the offset 220.

In one example, the wireless device 225-*a* may transmit the EH signal 210 to the network entity 105-*a* prior to receiving the control signal 205 scheduling the signal 215. For example, as shown in FIG. 2, the wireless device 225-*a* may transmit the EH signal 210 to the network entity 105-*a* during slot or symbol n. In such case, the network entity 105-*a* may receive the EH signal 210 and adjust one or more parameters included in or associated with the control signal 205 based on the offset 220 indicated in the EH signal 210. For example, the network entity 105-*a* may adjust the offset 220-*a* to be the offset 220-*c*. In some examples, the offset 220-*c* may indicate a longer duration between receiving the control signal 205 and communicating the signal 215 than the offset 220-*a* (e.g., 4 slots or symbols instead or 2 slots or symbols) such that the wireless device 225-*a* has more time to harvest energy for communication of the signal 215.

Alternatively or additionally, the network entity 105-*a* may adjust the signal 215 to be scheduled by the control signal 205 (e.g., adjust a starting symbol or a length of the signal 215 or reduce an amount of information being sent in the signal 215). At the slot or symbol n+1, the network entity 105-*a* may transmit the control signal 205 to the wireless device 225-*a* including the adjusted parameters and the wireless device 225-*a* may communicate the signal 215 according to the adjusted parameters included in the control signal 205 (e.g., the wireless device 225-*a* may communicate the signal at slot or symbol n+5 if the control signal 205 indicates the offset 220-*c*).

In another examples, the wireless device 225-*a* may transmit the EH signal to the network entity 105-*a* after receiving the control signal 205 scheduling the signal 215. For example, the wireless device 225-*a* may transmit the EH signal 210 to the network entity 105-*a* during slot or symbol n+2. In such example, the wireless device 225-*a* may utilize the information included in the control signal 205 (e.g., along with one or both of the power control model and the EH class) to determine the offset 220. For example, the wireless device 225-*a* may predict the power that will be consumed by the wireless device 225-*a* to communicate the signal 215 and determine an amount of time needed to harvest the predicted power. The wireless device 225-*a* may then utilize the amount of time needed to harvest the predicted power to determine or select an offset 220 to include in the EH signal 210.

In one example, the offset 220 included in the EH signal 210 may be a duration between receiving the control signal 205 and communicating the signal 215 (e.g., offset 220-*c*). In such example, the offset 220 may be equal to the amount of time needed to harvest the predicted power. In another example, the offset 220 included in the EH signal 210 may depend on the offset 220-*a* included in the control signal 205. That is, the offset 220 included in the EH signal 210 may be a duration between when the offset 220-*a* ends and communicating the signal 215 (e.g., offset 220-*b*). In such example, the offset 220-*b* may be equal to the amount of time needed to harvest the predicted power subtracted by the offset 220-*a*.

In some examples, the wireless device 225-*a* may select the offset 220 to include in the EH signal 210 from a set of offset values 220. In one example, the wireless device 225-*a* may select the offset 220 from the set of set offset values included in the TDRA table. In such example, each row of the TDRA table may include multiple offsets 220 and each offset 220 of the multiple offsets of a row may correspond to a respective EH class. The wireless device 225-*a* may receive (e.g., via the control signal 205) a single TDRA index value that points to a row in the TDRA table and select an offset 220 of the row that corresponds to the EH class of the wireless device 225-*a*. In another example, the wireless device 225-*a* may receive signaling configuring the wireless device 225-*a* with a table including a set of offsets 220 (e.g., different from the TDRA table). The table may include multiple rows and each row may correspond to a different offset 220. Further, the wireless device 225-*a* may be configured with multiple tables of offsets 220 and each table may correspond to a different EH class. The wireless device 225-*a* may first select the table based on an EH class of the wireless device 225-*a* and then select an offset 220 from the set of offsets included in the table (e.g., based on the power control model). In some examples, the selected offset 220 may be indicated to the network entity 105-*a* in the form of a table index value.

In some examples, the wireless device 225-*a* may identify a set of resources (e.g., time resources and frequency resources) over which to transmit the EH signal 210. In one example, the set of resources may be defined in the control signal 205 scheduling the signal 215. In another example, the set of resource may be defined by a CG. That is, the EH signal 210 may be transmitted over the set of resources during one or more periodic occasions defined in the CG once receiving a control signal activating the CG (e.g., activation DCI).

Alternatively, the wireless device 225-*a* may autonomously select the set of resources for transmitting the EH signal 210. For example, the wireless device 225-*a* may transmit the EH signal 210 any time after receiving the control signal 205 and prior to an end of an offset indicated by the control signal 205 (e.g., the offset 220-*a*). That is, the offset 220-*a* may represent a window of time over which the wireless device 225-*a* can select the set of resources and transmit the EH signal 210. In some examples, an ability for the wireless device 225-*a* to autonomously schedule transmission of the EH signal 210 may be enabled or disabled via signaling from the network entity 105-*a*. In one example, the control signal 205 may indicate enablement or disablement of the autonomous uplink mode. For example, the control signal 205 may be an example of DCI and the DCI information may include one or more fields (e.g., modulation and coding scheme (MCS) field, new data indicator (NDI) field, or hybrid automatic repeat request (HARQ) process number field). The value of the one or more field in the DCI may indicate enablement or disablement of the autonomous uplink mode. Alternatively, the DCI may include a field specific to the enablement and disablement of the autonomous uplink mode (e.g., uplink mode field). Alternatively, the network entity 105-*a* may determine enablement or disablement of the autonomous uplink mode based on the RNTI used to scramble the control signal 205 or a search space over which the control signal 205 is received.

In some examples, the control signal 205 may activate an SPS configuration or a CG configuration. Activating the SPS configuration may allow the wireless device 225-*a* to receive signaling via a set of resources during one or more periodic occasions specified in the SPS configuration. Activating the CG configuration may allow the wireless device 225-*a* to transmit signaling via a set of resources during one or more periodic occasions specified in the CG configuration. In either case, the wireless device 225-*a* may shift each periodic occasion following the first periodic occasion based on the offset 220 determined by the wireless device 225-*a*. For example, each periodic occasion may be separated by a duration that is a summation of the periodicity (e.g., indicated in the SPS configuration or the CG configuration) and the offset 220. Using the methods as described herein may allow a wireless device 225-*a* that supports EH procedures to select an offset between receiving control information and communicating a signal scheduled by the control information based on an EH capability which may enable the wireless device 225-*a* to have adequate time to harvest energy for communication of the signal. The signaling as described in FIG. 2 may occur over the Uu interface, the EH interface or the PC5 interface.

In some examples, the network entity 105-*a* may allocate a CG, where in the CG configuration, the wireless device 225-*a* may use any CG occasion within the CG to transmit an uplink signal (e.g., PUSCH or transport block (TB)). A CG may include a set of resources (e.g., periodic uplink resources) to transmit TB when there is data at the wireless device 225-*a* and/or the wireless device 225-*b*. In some examples, once the wireless device 225-*a* and/or the wireless device 225-*b* transmits a TB, the CG may be released (e.g., deactivated) or the wireless device 225-*a* and/or the wireless device 225-*b* may continue using the same CG to transmit other TBs. For example, the wireless device 225-*a* and/or the wireless device 225-*b* may continue using the same CG to transmit other TBs once sufficient energy is harvested (e.g., threshold) during a CG occasion. As such, the wireless device 225-*a* and/or the wireless device 225-*b* may use the CG to transmit a single TB or a set of TBs or packets with some TBs. Subsequent to the transmission, the wireless device 225-*a* and/or the wireless device 225-*b* may have to acquire a new DCI to indicate a CG. The network entity 105-*a* may assign resources to other wireless devices (e.g., UEs). In case of sidelink, the network entity 105-*a* or the wireless device 225-*a* and/or the wireless device 225-*b* (e.g., PLC/primary UE or controller) may assign resources to other wireless devices (e.g., UEs) in sidelink. Same for new interface controlled by UEs or a network or by the network entity 105-*a* and a controlling unit for that interface.

FIG. 3 illustrates an example of a table 300 that supports adaptive allocation timing for EH devices in accordance with one or more aspects of the present disclosure. In some examples, the table 300 may be implemented by aspects of the wireless communications system 100 and the wireless communications system 200. For example, the table 300 may be implemented by a UE 115 or a network entity 105 as described with reference to FIG. 1. The table 300 may be implemented by a wireless device 225 or a network entity 105 as described with reference to FIG. 2.

A wireless device (e.g., an EH device) may determine an offset 320 and transmit the offset 320 to a network entity (e.g., prior to or after receiving control information from the network entity scheduling subsequent communication). Based on the offset 320, the wireless device may delay communication of a signal (e.g., delay for a duration equal to the offset 320) after receiving the control information (e.g., DCI) scheduling the signal. In some examples, there may be different types of offsets 320. For example, an offset 320-*a* (or K2) may represent a duration between receiving the control information and transmitting an uplink signal (e.g., PUSCH) scheduled by the control information. By contrast, an offset 320-*b* (or K0) may represent a duration between receiving the control information and receiving a downlink signal (e.g., PDSCH) scheduled by the control information. Further, an offset 320-*c* may represent a duration between receiving the control information and receiving a reference signal (e.g., CSI-RS or DMRS). In some examples, the wireless device may determine the offset 320 based on an offset indicated in the control information (e.g., in the case that the offset 320 is indicated to the network entity after the control information is received). In such example, the wireless device may utilize the offset indicated in the control information as a starting point for the offset 320. That is, the wireless device may apply the offset 320 after the offset indicated in the control information.

In some examples, the wireless device may select the offset 320 from a set of offsets 320. The set of offsets 320 may be arranged in the form of a table 300. The table 300 may include a number of rows and each row of the table may correspond to a unique offset 320. For example, the table 300 may include four row and each row may correspond to one or more of a unique offset 320-*a*, offset 320-*b*, or offset 320-*c*. In some examples, the wireless device may receive signaling from the network entity indicating the table 300. For example, the network entity may transmit RRC signaling, a MAC-CE, or DCI indicating the table 300. Further, in some examples, the network entity may store (and potentially generate) multiple tables 300. Each table 300 of the multiple tables 300 may include different offsets 320 and each table 300 may correspond to a respective EH state. In such example, the network entity may transmit an indication of a table 300 corresponding to the respective EH state of the wireless device.

In some examples, the wireless device may select the offset 320 from the set of offsets 320 based on an one or more EH capabilities of the wireless device. For example, the wireless device may select the offset 320 from the set of offsets based on an energy charging profile, a discharging profile, an energy state profile, or a power model associated with the wireless device. As one example, the wireless device may determine that an efficiency associated with an EH procedure of the wireless device is low (e.g., below a threshold) and select an offset 320 from the set of offsets 320 that is associated with a longest duration when compared to the other offsets 320 of the set. As another example, the wireless device may determine an amount of energy is stored in a battery of the wireless device and select an offset 320 from the set of offsets that is associated with a shortest duration when compared to the other offsets 320 of the set.

After selecting the offset 320, the wireless device may transmit a signal to the network entity indicating the selected offset 320. In some examples, the indication of the offset 320 may include a row index that points to a specific row of the table 300. The row index value may include a number of bits and the logic value of the bits may indicate a specific row of the table 300. For example, a row index 01 may point to the first row of the table 300 which includes one or more of a value for offset 320-*a* ($X_0$), a value for the offset 320-*b* ($Y_0$), or a value of the offset 320-*c* ($Z_0$). Further, row indices 01, 10, and 11 may point to a second row, a third row, and a fourth row of the table 300, respectively.

Figure 4:
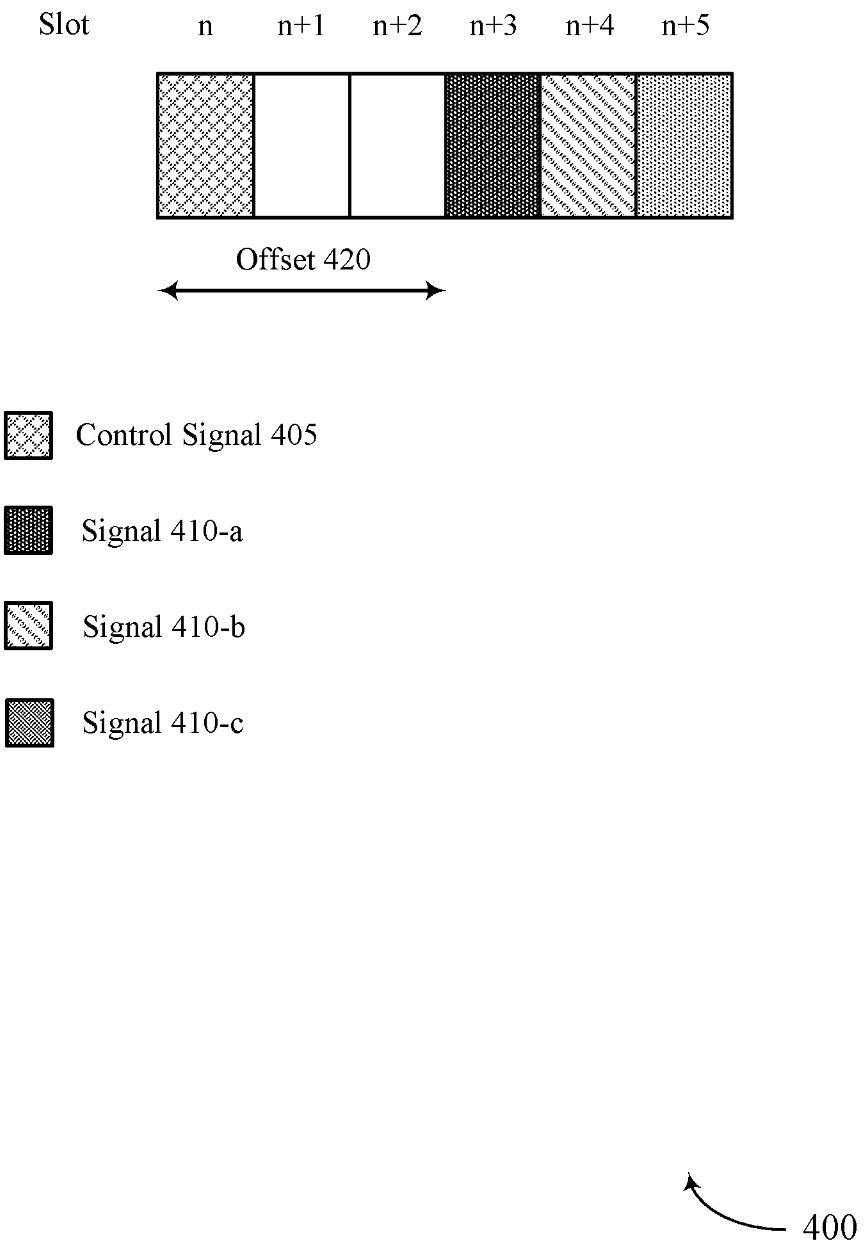
FIGS. 4 and 5 illustrate examples of a frame layout that supports adaptive allocation timing for EH devices in accordance with one or more aspects of the present disclosure.

FIG. 4 illustrates an example of a frame layout 400 that supports adaptive allocation timing for EH devices in accordance with one or more aspects of the present disclosure. In some examples, the frame layout 400 (also referred to as frame structure) may be implemented by aspects of the wireless communications system 100 and the wireless communications system 200. For example, the frame layout 400 may be implemented by a UE 115 or a network entity 105 as described with reference to FIG. 1. The frame layout 400 may be implemented by a wireless device 225 and a network entity 105 as described with reference to FIG. 2.

In the example of FIG. 4, a wireless device (e.g., an EH device) may receive a control signal 405 (e.g., DCI, sidelink control information (SCI), a control signal to manage the Uu interface, the PC5 interface, the EH interface, any L1 signal, or a signal associated with the EH interface) from a different device (e.g., from a different wireless device or a network entity) at slot n. In some examples, the control signal 405 may schedule the wireless device to transmit a signal 410-*a* (e.g., PSSCH or PUSCH). Further, the control signal 405 may include an offset 420. The offset 420 may indicate a number of slots between a slot used to receive the control signal 405 (e.g., the slot n) and a slot that the wireless device can potentially start transmission of the signal 410-*a*. In the example of FIG. 4, the offset 420 may be equal to 3 slots. Further, the wireless device may support an autonomous uplink mode. In the autonomous uplink, the wireless device may transmit the signal 410-*a* using any uplink resources during a time window after the offset 420 (e.g., if the wireless device has an adequate amount of energy stored for transmission of the signal 410-*a*). In the example of FIG. 4, the wireless device may transmit a signal 410-*a* during the slot n+3. The signal 410-*a* may span one slot or multiple slots (not shown).

In some examples, in response to the control signal 405, the wireless device may transmit (e.g., to a network entity or another device) an indication of an exact occasion (e.g., resource) that will be used for communication during the autonomous uplink mode. In some examples, the wireless device may transmit the indication using techniques such as backscattering or a backscattering-based radio techniques. Upon receiving the indication, a network entity or another device (e.g., a primary UE in sidelink or a controller) may assign the unused resources (e.g., set of resources the wireless device does not use in the autonomous uplink mode) to a different device.

In some examples, an ability for the wireless device to operate in the autonomous uplink mode may be enabled or disabled. In some examples, the autonomous uplink mode may be enabled or disabled via signaling received from the network entity. For example, the control signal 405 may be an example of DCI that includes one or more fields (e.g., MCS field, NDI field, or HARQ process number field) and a value of the one or more field in the DCI may indicate enablement or disablement of the autonomous uplink mode. Alternatively, the DCI may include a field specific to the enablement and disablement of the autonomous uplink mode (e.g., uplink mode field). Alternatively, the wireless device may determine enablement or disablement of the autonomous uplink mode based on the RNTI used to scramble the control signal 405 or the search space over which the control signal 405 is received.

In another example, the autonomous uplink mode may be disabled or enabled depending on energy communication state of the wireless device. In some examples, the wireless device may in one of three different energy communication states at a given time. A first energy communication state may include a state in which the wireless device is ready to communicate. A second energy communication state may include a state in which the wireless device may monitor for control signaling only. A third energy communication state may include a state in which the wireless device may not communicate and harvest energy. While the wireless device is in the first energy communication state, the wireless device may enable the autonomous uplink mode. Alternatively, while the wireless device is in the second energy communication state and the third energy communication state, the wireless device may disable the autonomous uplink mode.

In another example, the wireless device may transmit the signal 410-*a* using semi-persistent scheduling. In such example, the wireless device may receive signaling from the network entity (e.g., RRC signaling) indicating one or more CG configurations. Each CG configuration may include a set of resources and periodicity for the set of resources. Upon activation of the CG configuration (e.g., via the control signal 405), the wireless device may transmit the signal 410-*a* over the set of resources during one of the CG occasions when the wireless device has adequate energy to do so. In some examples, after transmitting the signal 410-*a*, the CG configuration may be released such that the network entity or another device (e.g., a primary UE in sidelink or a controller) may assign the unused resources (e.g., set of resources) to different devices via a second control signal. In another example, the CG configuration is released upon receiving an acknowledgment (ACK) message from network entity or another device indicating that the signal 410 was successfully received and decoded. In another examples, the number of CG occasions allocated to the wireless device may be limited. For example, the number of configure grant occasions may be limited to K occasions. In such example, the wireless device may transmit the signal 410-*a* during one of the K CG occasions. In some examples, the K value may be indicated in the CG configuration or in the DCI activating the CG configuration. In some other examples, a network entity may allocate a configured number of CG occasions to be used per TB for trial to transmit when a wireless device (e.g., a UE) has sufficient energy (e.g., every K occasions will be used to transmit a TB), and the wireless device may use one occasion. This K can be part of CG configuration or signaled to the wireless device using L1 signaling, L2 signaling, L3 signaling, or any combination thereof, including L1 as DCI for activation DCI of the CG.

In some examples, a network entity may transmit an ACK message and a CG may be released or deactivated (e.g., a wireless device does not keep using the CG after transmitting a TB). The network entity may assign resources to other wireless devices (e.g., UEs). In case of sidelink, a network entity (e.g., gNB) or sidelink PLC/primary UE or controller may assign resources to other wireless devices (e.g., UEs) in sidelink. This may be applicable for new interface controlled by UEs or a network or by a network entity (e.g., gNB) and a controlling unit for that interface. In some other examples, a CG may still be used for other TBs by the wireless device (e.g., a same EH UE), again, the wireless device may use one or more CG occasions when it has data traffic and sufficient energy to transmit other TBs.

In another example, the network entity may configure the wireless device with uplink repetition type A or type B. In uplink repetition type A, the wireless device may have an opportunity to transmit a repetition of the signal 410-*a* in each slot. In uplink repetition type B, the repetitions of the signal 410-*a* may be carried out in the consecutive mini-slots and there may be more than one repetition in one slot. While in this uplink repetition mode, the wireless device may transmit the signal 410-*a* during one of the repetition occasions when the wireless device has adequate energy to transmit the additional signaling. Once the wireless device transmits the additional signaling, the network entity may allocate the remaining (or unused) repetition occasions to different devices.

In some examples, the wireless device may use any repetition occasion to transmit a TB (again, not keep sending repetitions, but single transmission within the set of configured repetition). So, the wireless device may be configured with repetition but may end up using any occasion to transmit the transmission (e.g., one transmission). The uplink repetition type A may allow for time separation between allocations which allow for more energy harvesting time. Same as before, once the wireless device transmits data to the network, the network may reuse the remaining resources for repetitions.

A network entity may use a single DCI for scheduling multiple PUSCHs for a wireless device. In some examples, a single DCI may schedule up to X (X=8 now as max), the wireless device may transmit different TBs across multiple PUSCHs or a same TB. The multiple PUSCHs may use a single PUSCH occasion, when it harvest sufficient amount of energy, to transmit the TB. So, the wireless device may uses 1 out of the X. Once the wireless device transmits data the network entity, the network entity may reuse remaining resources for repetitions. The wireless device may be configured with K PUSCH occasions to transmit a single TB (e.g., use one occasion within each K), where K is configured as before using L1/L2/L3 including L1 as DCI for scheduling. In some examples, K=X.

In some examples, the control signal 405 may schedule the wireless device to transmit or receive multiple signals 410 (e.g., schedule multiple PDSCHs or PUSCHs). For example, the control signal 405 may schedule the wireless device to transmit the signal 410-*a*, the signal 410-*b*, and the signal 410-*c* during different signaling occasions. The signal 410-*a* and the signal 410-*c* may be repetition of the signal 410-*a* or different from the signal 410-*a*. In response to the control signal 405, the wireless device may limit the number of signals 410 that it can process based on its EH capability. For example, the wireless device may process the signals 410-*a* and the signal 410-*b*, but may not process the signal 410-*c*. In some examples, the wireless device may transmit a feedback message indicating whether or not the wireless device successfully received and decoded the signaling. In the case that the wireless device limits the number of signals scheduled by the control signal 405, the wireless device remove bits representative of feedback associated with signals 410 that the wireless device refrained from processing (e.g., the signal 410-*c*) or set a logic value of the bits to 1 which may indicate that the signals 410 were not received or decoded successfully (e.g., negative acknowledgment (NACK)). In another example, the wireless device may delay the processing of the signal 410-*a*, the signal 410-*c*, and the signal 410-*c* until the wireless device has adequate energy to process all of the signal 410-*a*, the signal 410-*b*, and the signal 410-*c*.

Alternatively, the wireless device may only use one of the signaling occasions to transmit the signal 410-*a* when the wireless device has adequate energy to transmit the signal. For example, the wireless device may skip the slot n+3 (or harvest energy during the slot n+3) and transmit the signal 410-*a* in the slot n+4. As such, the wireless device may utilize one out of the three signaling occasions. The network entity may then allocate the remaining signaling occasions to other devices (e.g., resources in slot n+3 and n+5). The signaling as described in FIG. 4 may occur over the Uu interface, the EH interface or the PC5 interface.

In some examples, the wireless device may indicate an occasion for transmission, for example, in response to the control signal 405 (e.g., a DCI). In some examples, for control signal 405 to manage Uu link or sidelink or new interface/link) or sidelink control information (SCI) or a control signal in sidelink SCI or new L1 signal to indicate then the wireless device may respond or a new link/interface control signal then the wireless device (e.g., EH UE) responds. If the wireless device has sufficient energy for transmitting a control signal, in response to the DCI and/or SCI, the wireless device may use its energy for transmitting the control signal. Alternately, the wireless device may use other techniques for transmitting the control signal that requires little energy, such as backscattering (or a backscattering-based (e.g., RFID tag like) radio when it does not have sufficient energy or at very low power states or sleep modes. When the network entity receives this indication from the wireless device, it can assign remaining resources to other wireless devices (e.g., UEs). This is uplink skipping indication from the wireless device.

Figure 5:
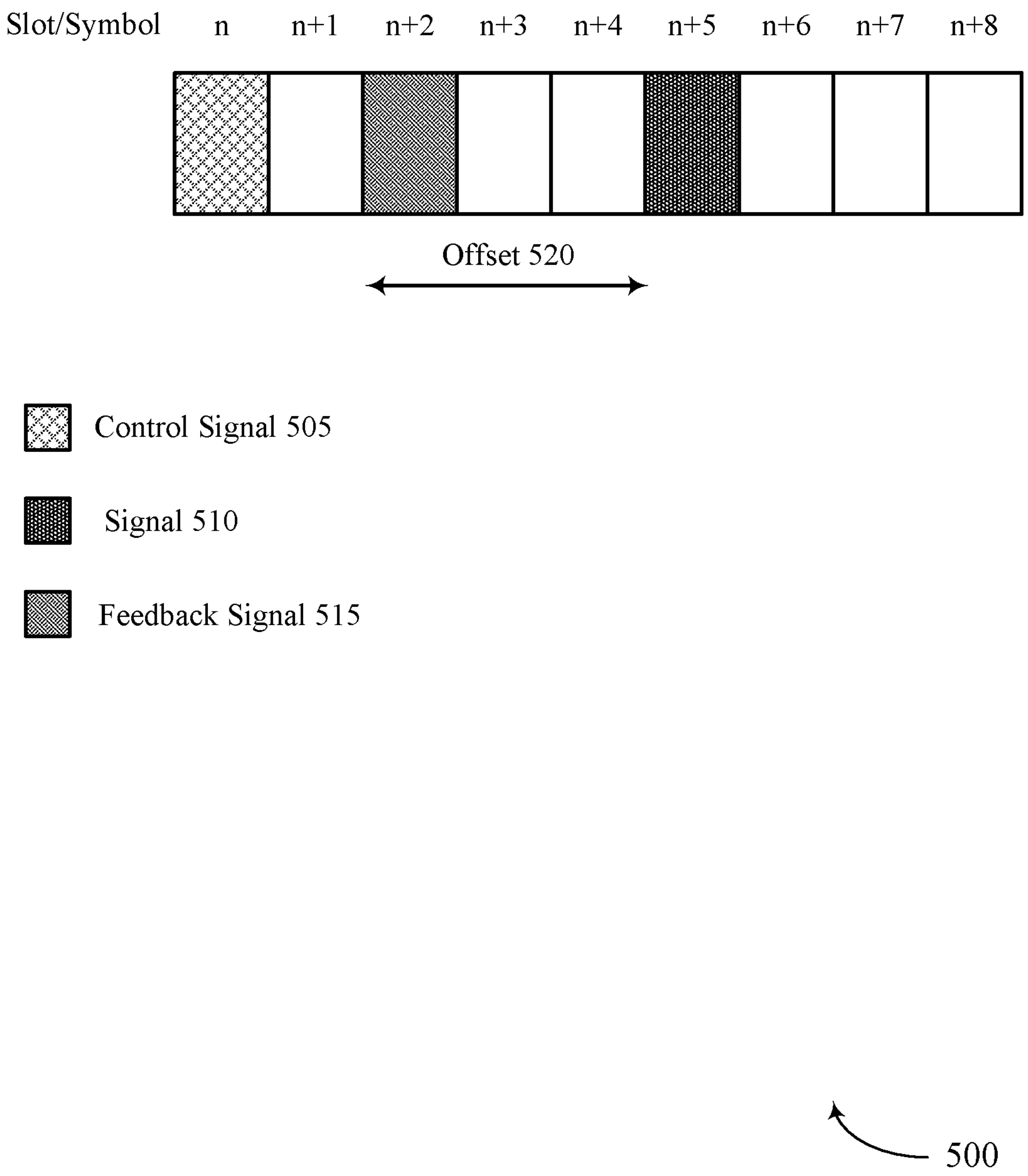

FIG. 5 illustrates an example of a frame layout 500 that supports adaptive allocation timing for EH devices in accordance with one or more aspects of the present disclosure. In some examples, the frame layout 500 (also referred to as frame structure) may be implemented by aspects of the wireless communications system 100 and a wireless communications system 200. For example, the frame layout 500 may be implemented by a UE 115 or a network entity 105 as described with reference to FIG. 1. The frame layout 500 may be implemented by a wireless device 225 or a network entity 105 as described with reference to FIG. 2.

In the example of FIG. 5, a wireless device (e.g., an EH device) may receive a control signal 505 (e.g., DCI or SCI) from a different device (e.g., from a different wireless device or a network entity). In some examples, the control signal 505 may schedule transmission or reception of a signal 510 by the wireless device. Further, the control signal 505 may include an indication of an offset 520. The offset 520 may refer to a duration (e.g., a quantity of slots or a quantity of symbols) between receiving the control signal 505 and communication of the signal 510. In some examples, the wireless device and the device may apply the offset 520 based on a decoding outcome of the control signal 505.

For example, if the wireless device decodes the control signal 505 successfully, the wireless device may transmit a feedback signal 515 at slot or symbol n+2 that includes ACK feedback. The ACK feedback may indicate to the device that the control signal 505 was decoded successfully by the wireless device. Additionally, the ACK feedback may indicate that the wireless device has the capability to transmit or receive the scheduled signal 510. In response to communicating the ACK feedback, the device and the wireless device may apply the offset 520. That is, the device and the wireless device may initiate a timer upon communication of the feedback signal 515. A duration of the timer may be equal to the offset 520. When the timer expires, the wireless device may communicate the signal 510. For example, as shown in FIG. 5, the offset 520 may be equal to 3 (e.g., 3 slots or symbols) and the wireless device may communicate the signal 510 3 slots or symbol after transmitting the feedback signal 515 (e.g., at slot or symbol n+5).

In another example, the wireless device may not decode the control signal 505 successfully. In such example, the wireless device may transmit a feedback signal 515 at slot or symbol n+2 that includes NACK feedback. The NACK feedback may indicate to the device that the control signal 505 was not decoded successfully by the wireless device. Additionally, the NACK feedback may indicate that the wireless device does not have the capability to transmit or receive the scheduled signal 510. In response to communicating the NACK feedback, the wireless device may not transmit or receive the scheduled signal 510. Further, upon receiving the feedback signal 515, the device may not monitor for the scheduled signal 510 and allocate the resources indented for communication of the signal 510 to a different device.

Alternatively, the wireless device may not have enough energy to transmit the feedback signal 515. In such example, the wireless device may not transmit a feedback signal 515 to the device at the slot or symbol n+2. If the scheduled signal 510 is an uplink signal and the device does not receive the feedback signal 515 at the slot or symbol n+2, the device may not expect the uplink signal from the wireless device and refrain from monitoring for the scheduled signal 510. If the signal 510 is a downlink signal and the device does not receive the feedback signal 515, the device may avoid transmitting the scheduled signal 510 to the wireless device or the device may transmit the signal 510 to the wireless device if the wireless device supports a radio frequency-based EH procedure. Alternatively, if the device does not receive the feedback signal 515, the device may apply an offset (e.g., default offset) that is greater than the offset 520 such that the wireless device may have more time to harvest energy for communication of the signal 510. For example, the wireless device may communicate the signal 510 in symbol or slot that is after the slot n+5. The signaling as described in FIG. 5 may occur over the Uu interface, the EH interface or the PC5 interface.

Figure 6:
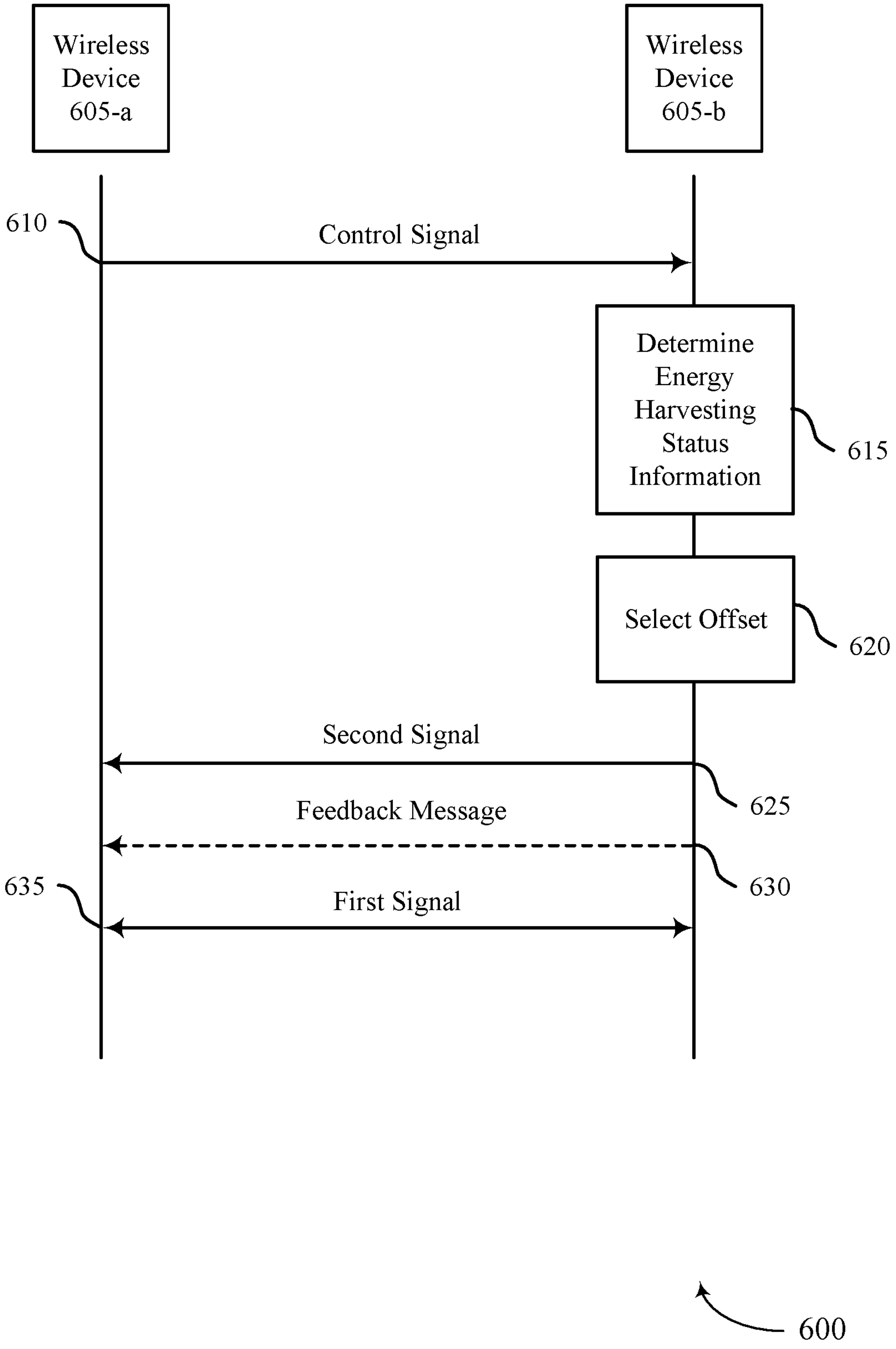
FIG. 6 illustrates an example of a process flow that supports adaptive allocation timing for EH devices in accordance with one or more aspects of the present disclosure.

FIG. 6 illustrates an example of a process flow 600 that supports adaptive allocation timing for EH devices in accordance with one or more aspects of the present disclosure. In some examples, the process flow 600 may implement or be implemented by aspects of a wireless communications system 100 and a wireless communications system 200. For example, the process flow 600 may be implemented by a UE 115 or a network entity 105 as described with reference to FIG. 1. The process flow 600 may be implemented by wireless devices 225 or a network entity 105 as described with reference to FIG. 2. Alternative examples of the following may be implemented, where some steps are performed in a different order than described or are not performed at all. In some cases, steps may include additional features not mentioned below, or further steps may be added.

At 610, the wireless device 605-*a* may transmit a first control signal to the wireless device 605-*b*. In some examples, the wireless device 605-*b* may be an example of an EH device and may support one or more EH procedures (e.g., radio frequency-based EH procedure, thermal-based EH, or solar-based EH). Further, the wireless device 605-*a* may be an example of a user equipment or a network entity. In some examples, the control signal may include scheduling information indicating a first set of resources for communicating a first signal and a first offset between receiving the first control signal and communicating the first signal.

At 615, the wireless device 605-*b* may determine energy status information associated with the wireless device 605-*b*. The energy status information may include one or more of an amount of power harvested by the wireless device 605-*b*, an amount of power to process reference signals at the wireless device 605-*b*, an amount of power to process data signals at the wireless device 605-*b*, an amount of power to process control signals at the wireless device 605-*b*, a battery leakage associated with the wireless device 605-*b*, a battery size associated with the wireless device 605-*b*, a time to turn on hardware associated with the wireless device 605-*b*, or a time to harvest power. In some examples, the first control signal may include scheduling information the indicates for the wireless device 205-*b* to communicate multiple channels. In such example, the wireless device 205-*b* may limit the number of channels based on the energy status information. For example, the wireless device 205-*b* may communicate a subset of the set of channels.

At 620, the wireless device 605-*b* may select a second offset between receiving the first control signal and communicating the first signal. In some examples, the wireless device 605-*b* may select the second offset based on the energy status information associated with the wireless device 605-*b*. Further, in some examples, the wireless device 605-*b* may select the second offset from a set of second offsets and each second offset of the set may correspond to a respective combination of a start and length indicator and channel type. In some examples, the wireless device 605-*b* may receive signaling indicating the set of second offsets. The first offset and the second offset may indicate a duration (e.g., a quantity or symbols or slots) between receiving the first control signal and transmitting the first signal.

At 625, the wireless device 605-*b* may transmit, via a second set of resources, a second signal to the wireless device 605-*a* indicating the selected second offset. In one example, the wireless device 605-*b* may transmit the second signal to the wireless device 605-*a* prior to receiving the first control signal. In such example, the wireless device 605-*a* may take into account the second offset when determining the first offset. For example, the wireless device 605-*a* may set the first offset equal to the second offset.

In another example, the wireless device 605-*b* may transmit the second signal to the wireless device 605-*a* after receiving the first control signal. In such example, the wireless device 205-*b* may transmit the second signal during at least a portion of the first offset. Further, in such example, the first offset may be different from the second offset. For example, the second offset may be greater than the second offset. Further, in some examples, the second offset may be an offset from the first offset. In such example, the second offset may be applied by the wireless device 605-*a* and the wireless device 605-*b* after the first offset.

In some examples, the wireless device 605-*b* may receive second scheduling information indicating the second set of resources for transmitting the second signal. In some examples, the first control information may include the second set of resources. In another example, the wireless device 605-*a* may receive a second control signal activating a set of periodic communication occasions and the wireless device 605-*a* may transmit the second signal during one of the set of periodic communication occasions.

At 630, the wireless device 605-*b* may potentially transmit a feedback message to the wireless device 605-*a*. The feedback message may indicate whether or not the wireless device 605-*b* decoded the control signal received at 610 successfully. In the case that the wireless device 605-*b* transmits an ACK feedback message, the wireless device 605-*a* may initiate a timer upon receiving the ACK feedback message and communicate the first signal upon expiration of the timer. In some examples, a duration of the timer may be equal to the second offset.

At 635, the wireless device 605-*b* may communicate the first signal via the first set of resources based on the second offset. In one example, the first signal may be an uplink message and as such, the wireless device 605-*b* may transmit the first signal to the wireless device 605-*a*. In another example, the wireless first signal may be a downlink message and as such, the wireless device 605-*a* may receive the first signal from the wireless device 605-*a*.

In some examples, the wireless device 605-*a* may operate in an autonomous uplink mode. In the autonomous uplink mode, the wireless device 605-*b* may transmit uplink signaling (e.g., the first signaling or different signaling) during a third offset that is after the second offset. That is, the wireless device 605-*a* may autonomously select resources during a window of time after the second offset when the wireless device 605-*a* has sufficient energy to transmit the uplink signaling. In some examples, the autonomous unlink mode may be enabled or disabled at the wireless device 605-*b*. The wireless device 605-*b* may receive signaling indicating the enabled or disabled state of the autonomously uplink mode. As one example, the enablement or disabled state of the autonomously uplink mode may depend on a value of one or more fields of DCI received by the wireless device 605-*b*.

Figure 7:
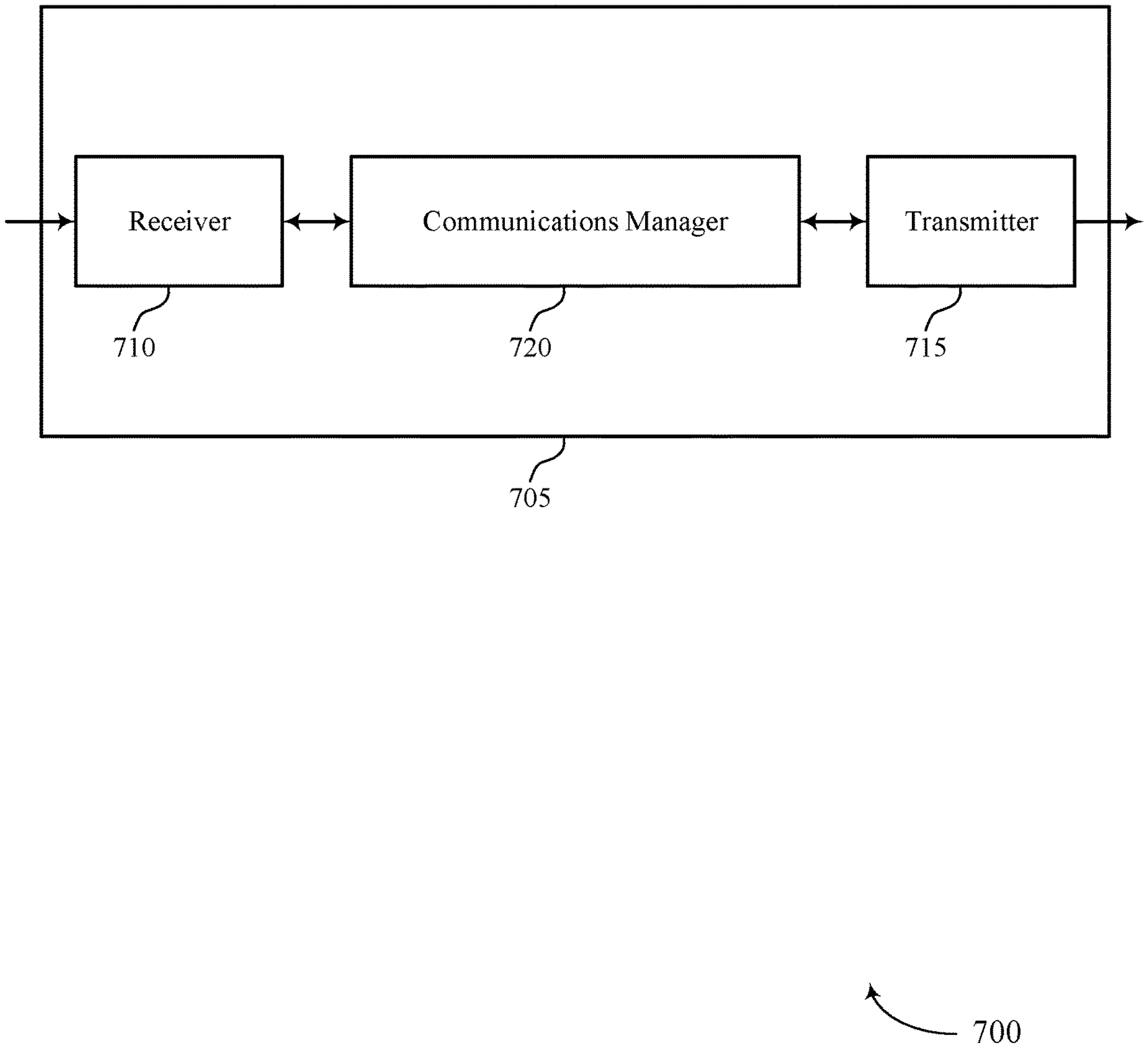
FIGS. 7 and 8 illustrate block diagrams of devices that support adaptive allocation timing for EH devices in accordance with one or more aspects of the present disclosure.

FIG. 7 illustrates a block diagram 700 of a device 705 that supports adaptive allocation timing for EH devices in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to adaptive allocation timing for EH devices). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to adaptive allocation timing for EH devices). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of adaptive allocation timing for EH devices as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software) executed by a processor. If implemented in code executed by a processor, the functions of the communications manager 720, the receiver 710, the transmitter 715, or various combinations or components thereof may be performed by a general-purpose processor, a DSP, a GPU, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at an EH device (e.g., the device 705) in accordance with examples as disclosed herein. For example, the communications manager 720 may be configured as or otherwise support a means for receiving a first control signal that includes scheduling information for the EH device, the scheduling information indicating a first set of resources for communicating a first signal and a first offset between receiving the first control signal and communicating the first signal. The communications manager 720 may be configured as or otherwise support a means for transmitting, via a second set of resources, a second signal indicating a second offset between receiving the first control signal and communicating the first signal. The communications manager 720 may be configured as or otherwise support a means for communicating the first signal via the first set of resources based on the second offset.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced power consumption, and more efficient utilization of communication resources.

Figure 8:
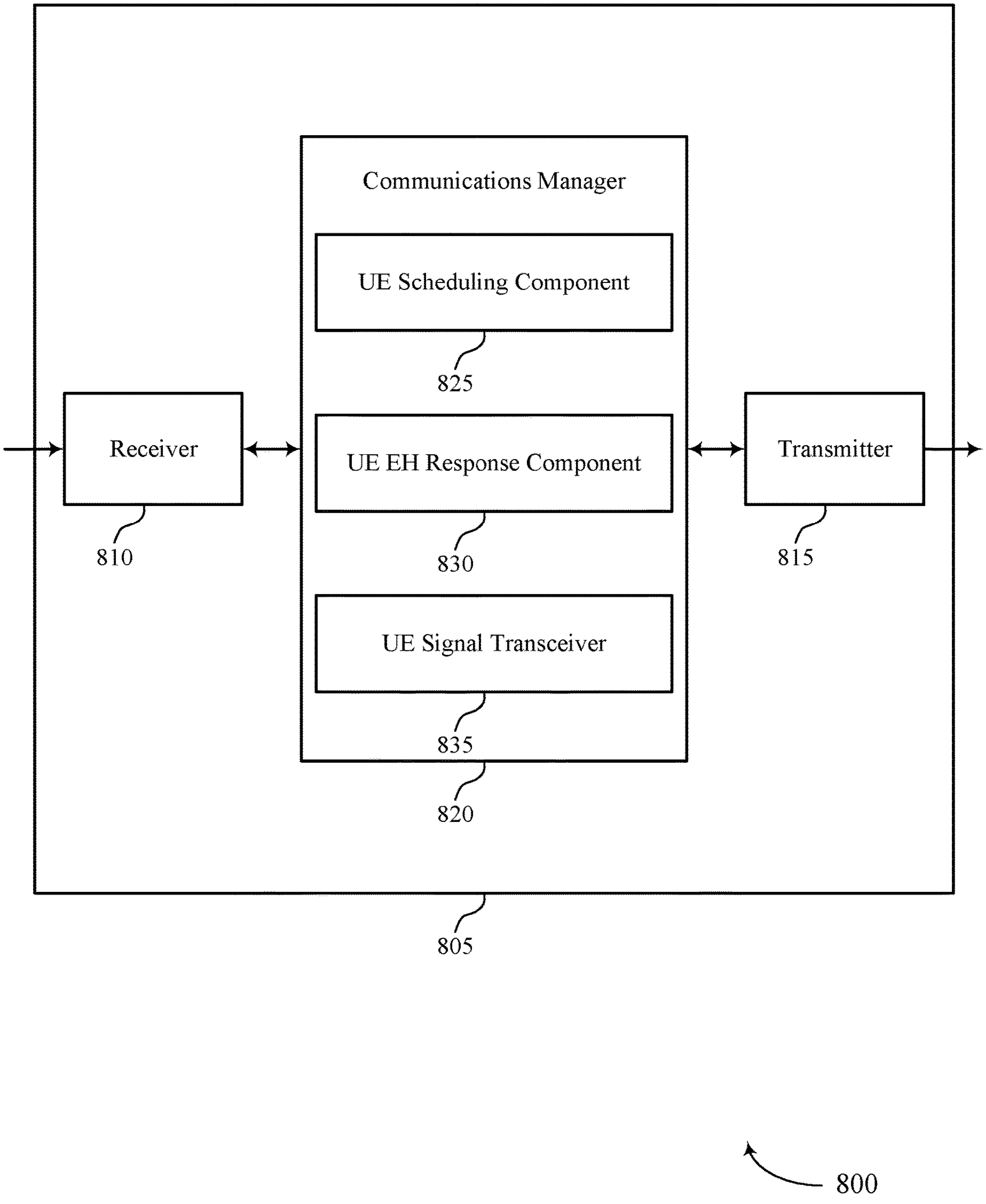

FIG. 8 illustrates a block diagram 800 of a device 805 that supports adaptive allocation timing for EH devices in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to adaptive allocation timing for EH devices). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to adaptive allocation timing for EH devices). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of adaptive allocation timing for EH devices as described herein. For example, the communications manager 820 may include a UE scheduling component 825, a UE EH response component 830, a UE signal transceiver 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at an EH device (e.g., the device 805) in accordance with examples as disclosed herein. The UE scheduling component 825 may be configured as or otherwise support a means for receiving a first control signal that includes scheduling information for the EH device, the scheduling information indicating a first set of resources for communicating a first signal and a first offset between receiving the first control signal and communicating the first signal. The UE EH response component 830 may be configured as or otherwise support a means for transmitting, via a second set of resources, a second signal indicating a second offset between receiving the first control signal and communicating the first signal. The UE signal transceiver 835 may be configured as or otherwise support a means for communicating the first signal via the first set of resources based on the second offset.

Figure 9:
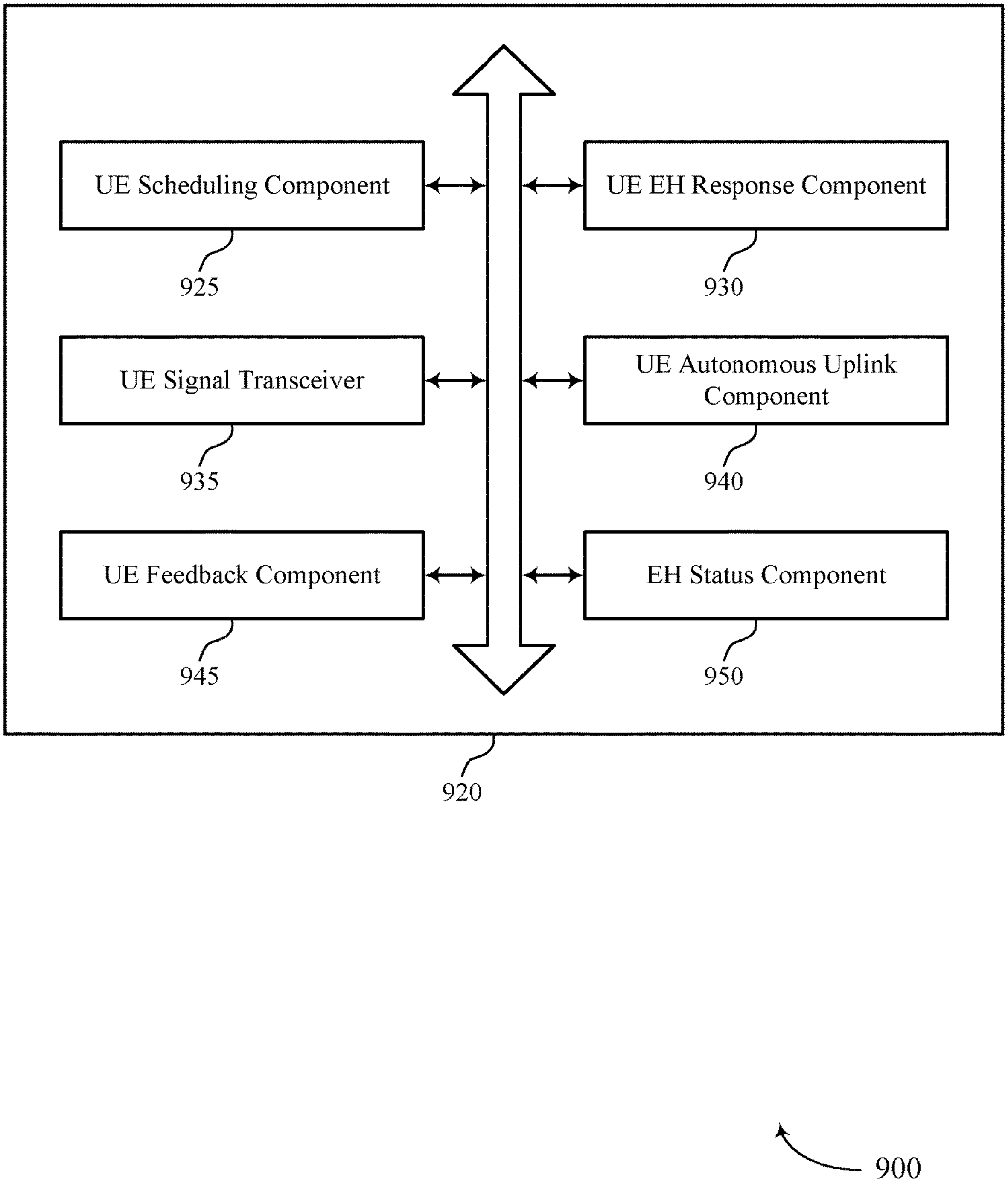
FIG. 9 illustrates a block diagram of a communications manager that supports adaptive allocation timing for EH devices in accordance with one or more aspects of the present disclosure.

FIG. 9 illustrates a block diagram 900 of a communications manager 920 that supports adaptive allocation timing for EH devices in accordance with one or more aspects of the present disclosure. The communications manager 920 may be an example of aspects of a communications manager 720, a communications manager 820, or both, as described herein. The communications manager 920, or various components thereof, may be an example of means for performing various aspects of adaptive allocation timing for EH devices as described herein. For example, the communications manager 920 may include a UE scheduling component 925, a UE EH response component 930, a UE signal transceiver 935, a UE autonomous uplink component 940, a UE feedback component 945, a EH status component 950, or any combination thereof. Each of these components may communicate, directly or indirectly, with one another (e.g., via one or more buses).

The communications manager 920 may support wireless communication at an EH device in accordance with examples as disclosed herein. The UE scheduling component 925 may be configured as or otherwise support a means for receiving a first control signal that includes scheduling information for the EH device, the scheduling information indicating a first set of resources for communicating a first signal and a first offset between receiving the first control signal and communicating the first signal. The UE EH response component 930 may be configured as or otherwise support a means for transmitting, via a second set of resources, a second signal indicating a second offset between receiving the first control signal and communicating the first signal. The UE signal transceiver 935 may be configured as or otherwise support a means for communicating the first signal via the first set of resources based on the second offset.

In some examples, to support transmitting the second signal, the UE EH response component 930 may be configured as or otherwise support a means for transmitting the second signal during at least a portion of the first offset.

In some examples, the UE EH response component 930 may be configured as or otherwise support a means for selecting the second offset from a set of multiple second offsets. In some examples, each of the set of multiple second offsets corresponds to a respective combination of a start and length indicator and a channel type. In some examples, the UE EH response component 930 may be configured as or otherwise support a means for receiving a second control signal indicating the set of multiple second offsets.

In some examples, the UE scheduling component 925 may be configured as or otherwise support a means for receiving a second control signal, the second control signal activating a set of multiple periodic communication occasions. In some examples, transmitting the second signal occurs during a periodic communication occasion of the set of multiple periodic communication occasions.

In some examples, the first control signal further includes a third set of resources for transmitting the second signal.

In some examples, the UE autonomous uplink component 940 may be configured as or otherwise support a means for transmitting, during a third offset that is after the second offset, a third signal via a third set of resources. In some examples, the UE autonomous uplink component 940 may be configured as or otherwise support a means for receiving a second control signal indicating an enabled state or a disabled state. In some examples, transmitting the third signal during the third set of resources is based on the second control signal indicating the enabled state.

In some examples, to support receiving the second control signal, the UE autonomous uplink component 940 may be configured as or otherwise support a means for receiving control information. In some examples, the indication of the enabled state or the disabled state is based on a value of one or more fields of the control information. In some examples, the UE autonomous uplink component 940 may be configured as or otherwise support a means for receiving a third control signal indicating the third offset.

In some examples, the UE feedback component 945 may be configured as or otherwise support a means for transmitting an ACK message associated with the first control signal. In some examples, the UE feedback component 945 may be configured as or otherwise support a means for initiating a timer based on transmitting the ACK message, where a duration of the timer includes the second offset, and where the first signal is communicated upon expiration of the timer.

In some examples, the first control signal further includes scheduling information for communicating a set of channels, and the UE signal transceiver 935 may be configured as or otherwise support a means for communicating a subset of the set of channels.

In some examples, to support transmitting the second signal, the UE EH response component 930 may be configured as or otherwise support a means for transmitting the second signal prior to receiving the first control signal, where the first offset is equal to the second offset. In some examples, the first offset is different from the second offset. In some examples, the second offset is an offset with respect to the first offset.

In some examples, the first offset includes a first duration between receiving the first control signal and communicating the first signal and the second offset includes a second duration between receiving the first control signal and communicating the first signal.

In some examples, the EH status component 950 may be configured as or otherwise support a means for determining energy status information associated with the EH device, where the second offset is based on the energy status information.

In some examples, the energy status information is based on an amount of power harvested by the EH device, an amount of power to process reference signals at the EH device, an amount of power to process data signals at the EH device, an amount of power to process control signals at the EH device, a battery leakage associated with the EH device, a battery size associated with the EH device, a time to turn on hardware associated with the EH device, a time to harvest power, or a combination thereof.

In some examples, to support communicating the first signal, the UE signal transceiver 935 may be configured as or otherwise support a means for transmitting the first signal via the first set of resources.

In some examples, to support communicating the first signal, the UE signal transceiver 935 may be configured as or otherwise support a means for receiving the first signal via the first set of resources.

Figure 10:
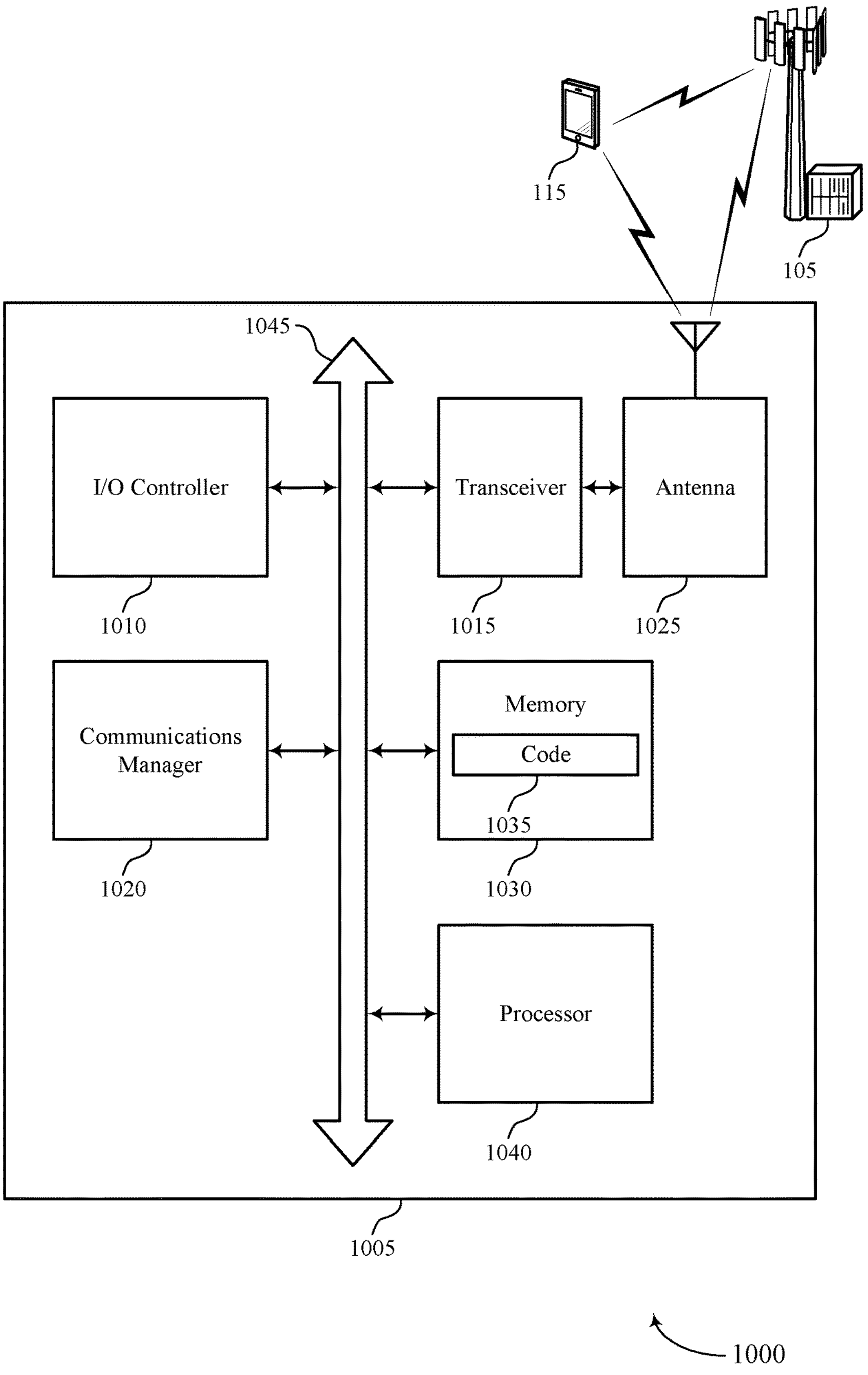
FIG. 10 illustrates a diagram of a system including a device that supports adaptive allocation timing for EH devices in accordance with one or more aspects of the present disclosure.

FIG. 10 illustrates a diagram of a system 1000 including a device 1005 that supports adaptive allocation timing for EH devices in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a GPU, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting adaptive allocation timing for EH devices). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at an EH device (e.g., the device 1005) in accordance with examples as disclosed herein. For example, the communications manager 1020 may be configured as or otherwise support a means for receiving a first control signal that includes scheduling information for the EH device, the scheduling information indicating a first set of resources for communicating a first signal and a first offset between receiving the first control signal and communicating the first signal. The communications manager 1020 may be configured as or otherwise support a means for transmitting, via a second set of resources, a second signal indicating a second offset between receiving the first control signal and communicating the first signal. The communications manager 1020 may be configured as or otherwise support a means for communicating the first signal via the first set of resources based on the second offset.

By including or configuring the communications manager 1020 in accordance with examples as described herein, the device 1005 may support techniques for reduced power consumption, more efficient utilization of communication resources, and improved coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 (e.g., directly, indirectly, after pre-processing, without pre-processing) to cause the device 1005 to perform various aspects of adaptive allocation timing for EH devices as described herein, or the processor 1040 and the memory 1030 may be otherwise configured to perform or support such operations.

Figure 11:
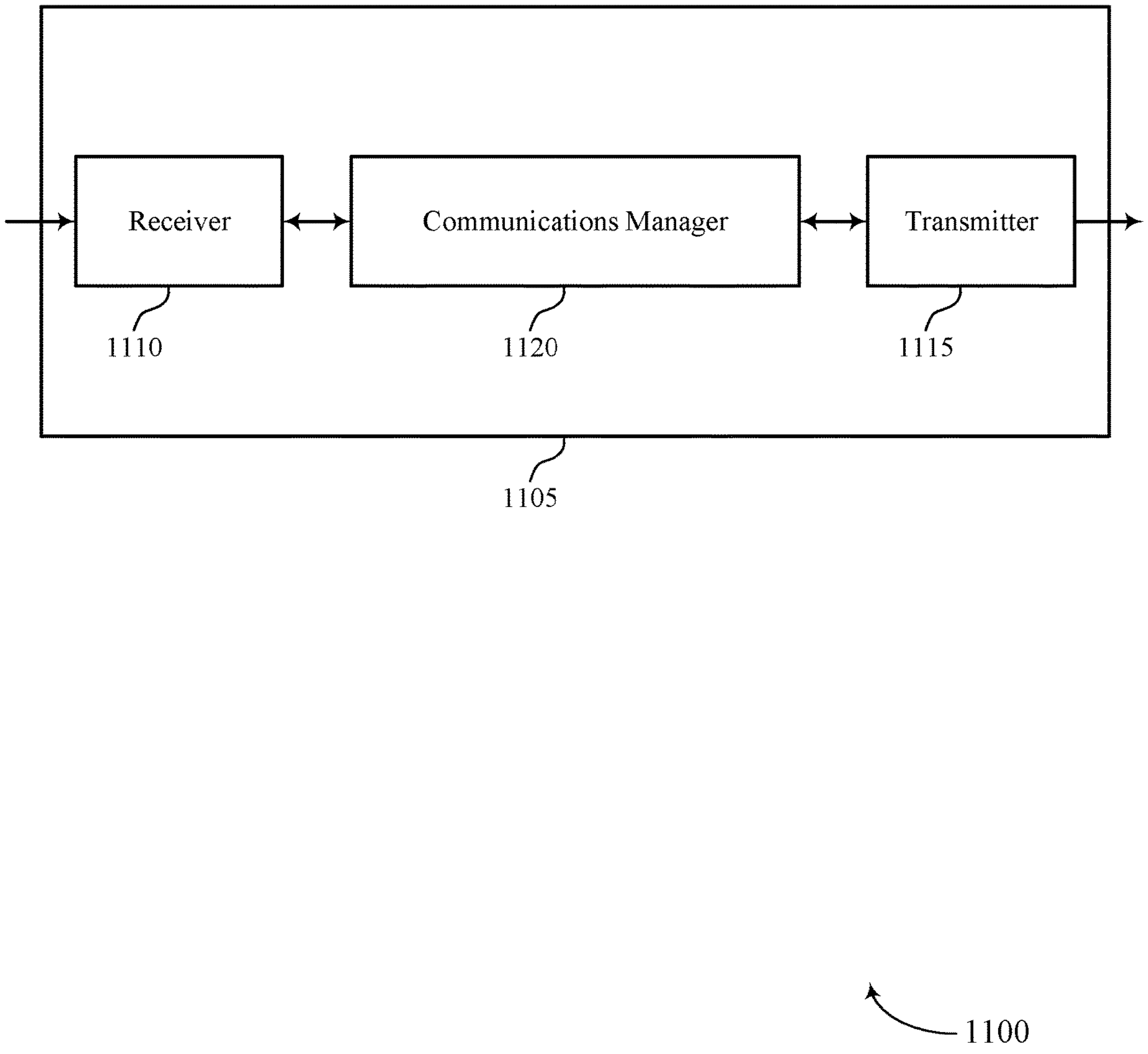
FIGS. 11 and 12 illustrate block diagrams of devices that support adaptive allocation timing for EH devices in accordance with one or more aspects of the present disclosure.

FIG. 11 illustrates a block diagram 1100 of a device 1105 that supports adaptive allocation timing for EH devices in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of adaptive allocation timing for EH devices as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a GPU, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software) executed by a processor. If implemented in code executed by a processor, the functions of the communications manager 1120, the receiver 1110, the transmitter 1115, or various combinations or components thereof may be performed by a general-purpose processor, a DSP, a GPU, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity (e.g., the device 1105) in accordance with examples as disclosed herein. For example, the communications manager 1120 may be configured as or otherwise support a means for transmitting a first control signal that includes scheduling information for an EH device, the scheduling information indicating a first set of resources for communicating a first signal and a first offset between receiving the first control signal and communicating the first signal. The communications manager 1120 may be configured as or otherwise support a means for receiving, via a second set of resources, a second signal indicating a second offset between receiving the first control signal and communicating the first signal. The communications manager 1120 may be configured as or otherwise support a means for communicating the first signal via the first set of resources based on the second offset.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing, reduced power consumption, and more efficient utilization of communication resources.

Figure 12:
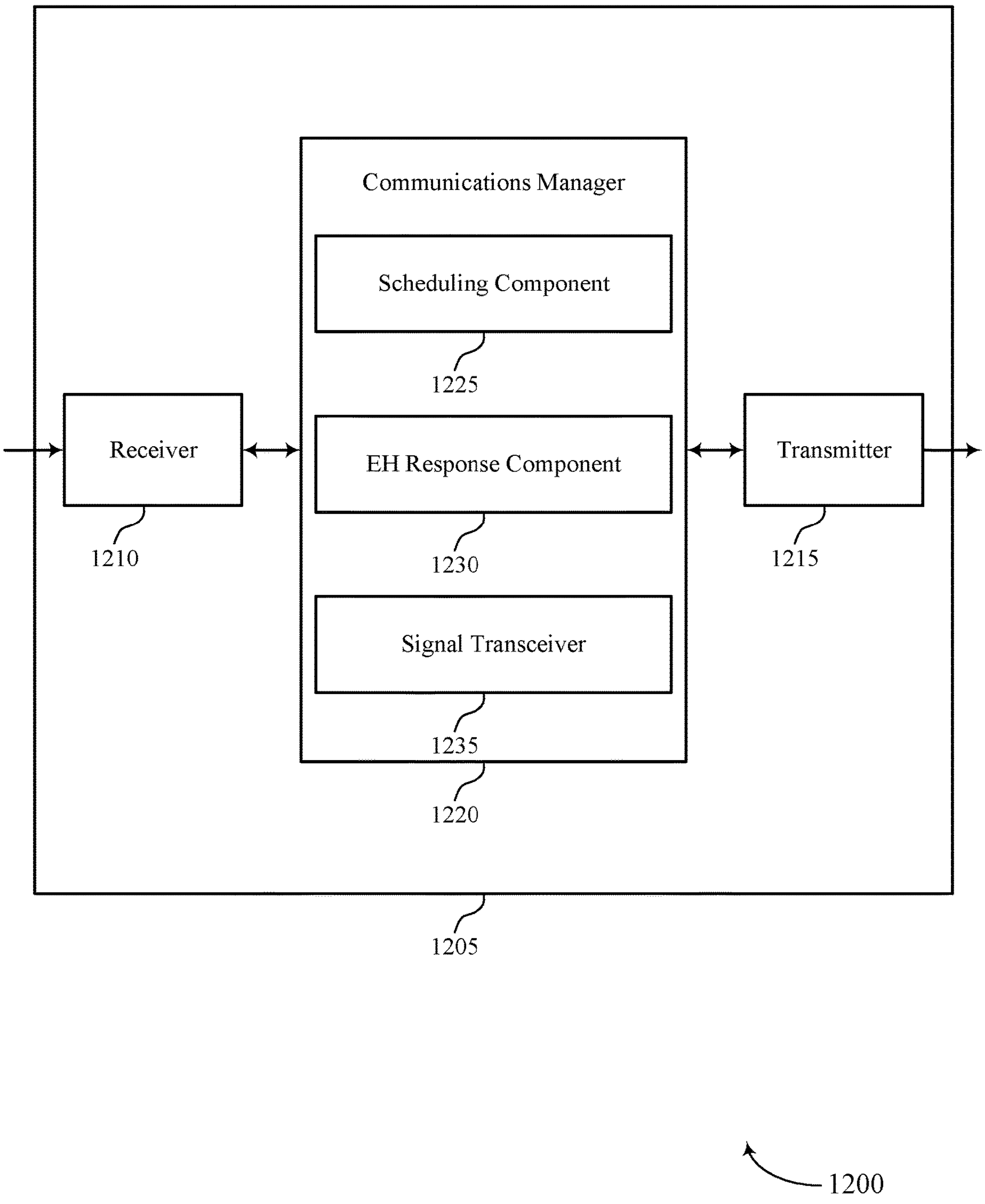

FIG. 12 illustrates a block diagram 1200 of a device 1205 that supports adaptive allocation timing for EH devices in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of adaptive allocation timing for EH devices as described herein. For example, the communications manager 1220 may include a scheduling component 1225, a EH response component 1230, a signal transceiver 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity (e.g., the device 1205) in accordance with examples as disclosed herein. The scheduling component 1225 may be configured as or otherwise support a means for transmitting a first control signal that includes scheduling information for an EH device, the scheduling information indicating a first set of resources for communicating a first signal and a first offset between receiving the first control signal and communicating the first signal. The EH response component 1230 may be configured as or otherwise support a means for receiving, via a second set of resources, a second signal indicating a second offset between receiving the first control signal and communicating the first signal. The signal transceiver 1235 may be configured as or otherwise support a means for communicating the first signal via the first set of resources based on the second offset.

Figure 13:
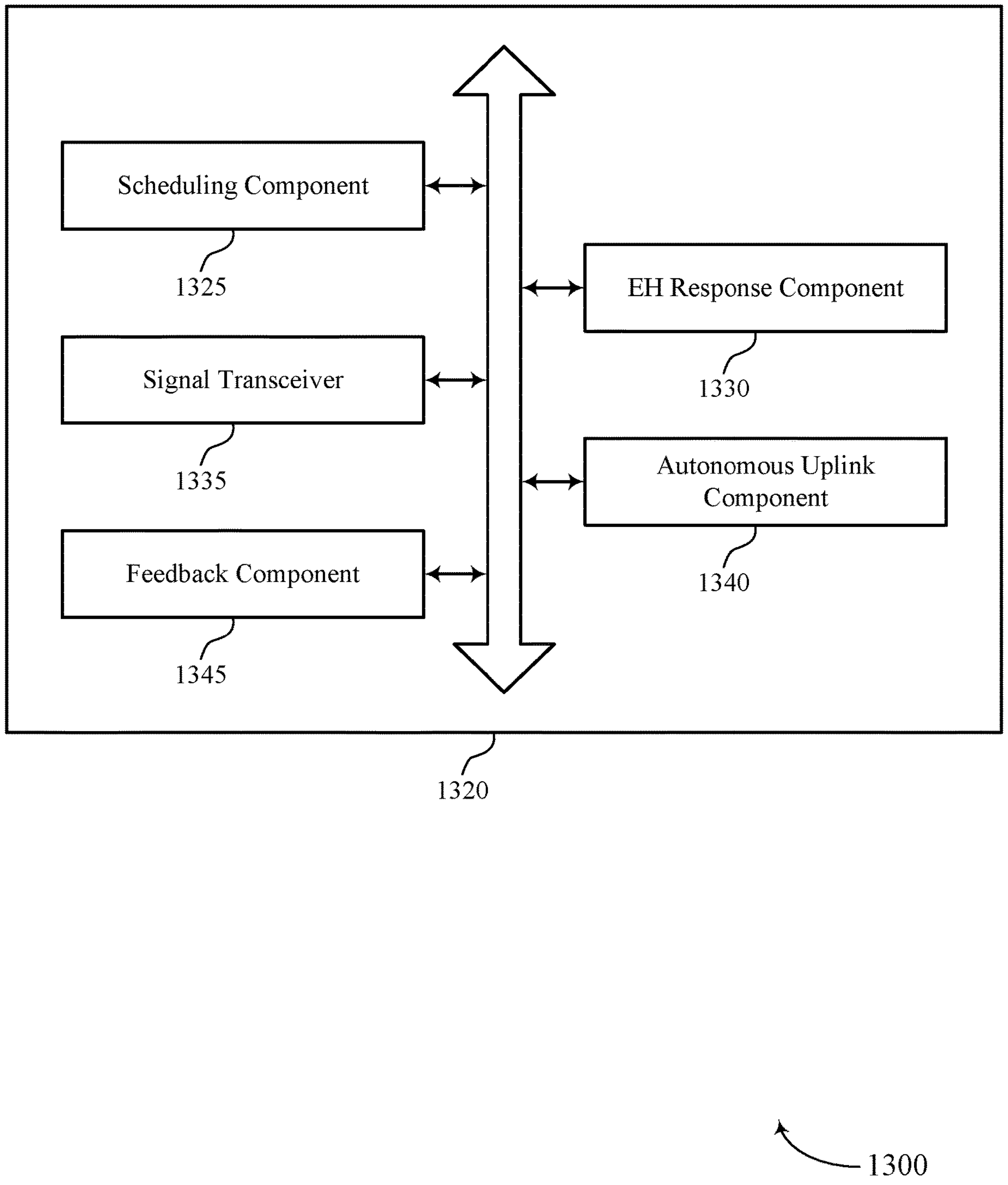
FIG. 13 illustrates a block diagram of a communications manager that supports adaptive allocation timing for EH devices in accordance with one or more aspects of the present disclosure.

FIG. 13 illustrates a block diagram 1300 of a communications manager 1320 that supports adaptive allocation timing for EH devices in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of adaptive allocation timing for EH devices as described herein. For example, the communications manager 1320 may include a scheduling component 1325, a EH response component 1330, a signal transceiver 1335, an autonomous uplink component 1340, a feedback component 1345, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication at a network entity in accordance with examples as disclosed herein. The scheduling component 1325 may be configured as or otherwise support a means for transmitting a first control signal that includes scheduling information for an EH device, the scheduling information indicating a first set of resources for communicating a first signal and a first offset between receiving the first control signal and communicating the first signal. The EH response component 1330 may be configured as or otherwise support a means for receiving, via a second set of resources, a second signal indicating a second offset between receiving the first control signal and communicating the first signal. The signal transceiver 1335 may be configured as or otherwise support a means for communicating the first signal via the first set of resources based on the second offset.

In some examples, to support receiving the second signal, the EH response component 1330 may be configured as or otherwise support a means for receiving the second signal during at least a portion of the first offset.

In some examples, the EH response component 1330 may be configured as or otherwise support a means for transmitting a second control signal indicating a set of multiple second offsets.

In some examples, the scheduling component 1325 may be configured as or otherwise support a means for transmitting a second control signal, the second control signal activating a set of multiple periodic communication occasions, where receiving the second signal occurs during a periodic communication occasion of the set of multiple periodic communication occasions. In some examples, the first control signal further includes a third set of resources for transmitting the second signal.

In some examples, the autonomous uplink component 1340 may be configured as or otherwise support a means for receiving, during a third offset that is after the second offset, a third signal via a third set of resources.

In some examples, the autonomous uplink component 1340 may be configured as or otherwise support a means for transmitting a second control signal indicating an enabled state or a disabled state, where receiving the third signal during the third set of resources is based on the second control signal indicating the enabled state.

In some examples, to support transmitting the second control signal, the autonomous uplink component 1340 may be configured as or otherwise support a means for transmitting control information, where the indication of the enabled state or the disabled state is based on a value of one or more fields of the control information.

In some examples, the autonomous uplink component 1340 may be configured as or otherwise support a means for transmitting a third control signal indicating the third offset.

In some examples, the feedback component 1345 may be configured as or otherwise support a means for receiving an ACK message associated with the first control signal. In some examples, the feedback component 1345 may be configured as or otherwise support a means for initiating a timer based on receiving the ACK message, where a duration of the timer includes the second offset, and where the first signal is communicated upon expiration of the timer.

In some examples, to support receiving the second signal, the EH response component 1330 may be configured as or otherwise support a means for receiving the second signal prior to receiving the first control signal, where the first offset is equal to the second offset. In some examples, the first offset is different from the second offset. In some examples, the second offset is an offset with respect to the first offset.

In some examples, the first offset includes a first number of time units between a time unit used for transmitting the first control signal and a time unit for communicating the first signal and the second offset includes a second number of time units between the time unit used for transmitting the first control signal and the time unit for communicating the first signal.

In some examples, the second offset is based on energy status information associated with the EH device. In some examples, the energy status information is based on an amount of power harvested by the EH device, an amount of power to process reference signals at the EH device, an amount of power to process data signals at the EH device, an amount of power to process control signals at the EH device, a battery leakage associated with the EH device, a battery size associated with the EH device, a time to turn on hardware associated with the EH device, a time to harvest power, or a combination thereof.

In some examples, to support communicating the first signal, the signal transceiver 1335 may be configured as or otherwise support a means for transmitting the first signal via the first set of resources.

In some examples, to support communicating the first signal, the signal transceiver 1335 may be configured as or otherwise support a means for receiving the first signal via the first set of resources.

Figure 14:
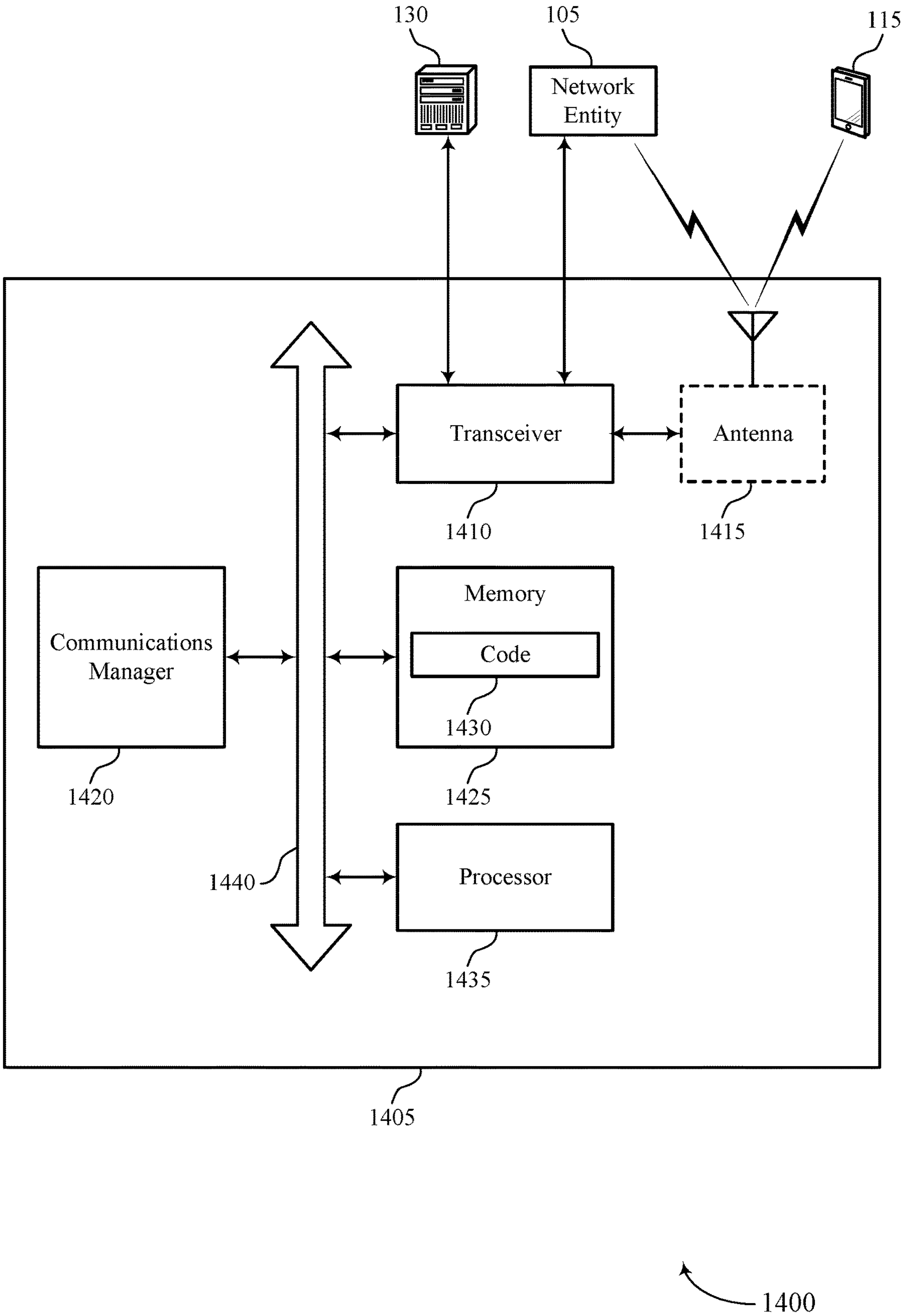
FIG. 14 illustrates a diagram of a system including a device that supports adaptive allocation timing for EH devices in accordance with one or more aspects of the present disclosure.

FIG. 14 illustrates a diagram of a system 1400 including a device 1405 that supports adaptive allocation timing for EH devices in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include a hardware device (e.g., a general-purpose processor, a DSP, a GPU, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting adaptive allocation timing for EH devices). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication at a network entity (e.g., the device 1405) in accordance with examples as disclosed herein. For example, the communications manager 1420 may be configured as or otherwise support a means for transmitting a first control signal that includes scheduling information for an EH device, the scheduling information indicating a first set of resources for communicating a first signal and a first offset between receiving the first control signal and communicating the first signal. The communications manager 1420 may be configured as or otherwise support a means for receiving, via a second set of resources, a second signal indicating a second offset between receiving the first control signal and communicating the first signal. The communications manager 1420 may be configured as or otherwise support a means for communicating the first signal via the first set of resources based on the second offset.

By including or configuring the communications manager 1420 in accordance with examples as described herein, the device 1405 may support techniques for reduced power consumption, more efficient utilization of communication resources, and improved coordination between devices.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 (e.g., directly, indirectly, after pre-processing, without pre-processing) to cause the device 1405 to perform various aspects of adaptive allocation timing for EH devices as described herein, or the processor 1435 and the memory 1425 may be otherwise configured to perform or support such operations.

Figure 15:
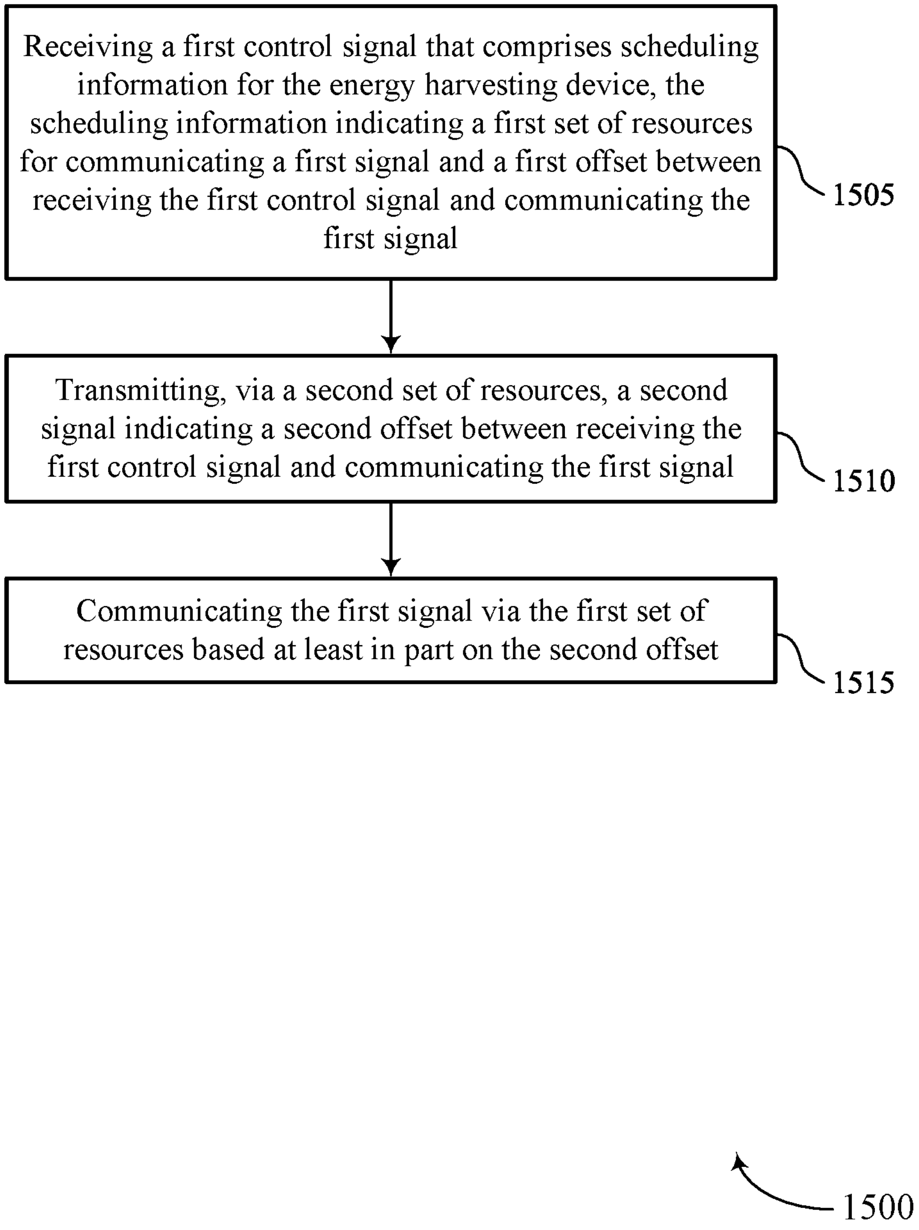
FIGS. 15 through 18 illustrate flowcharts showing methods that support adaptive allocation timing for EH devices in accordance with one or more aspects of the present disclosure.

FIG. 15 illustrates a flowchart showing a method 1500 that supports adaptive allocation timing for EH devices in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving a first control signal that comprises scheduling information for the EH device, the scheduling information indicating a first set of resources for communicating a first signal and a first offset between receiving the first control signal and communicating the first signal. The operations of 1505 may be performed in accordance with examples as disclosed herein. In some examples, aspects of the operations of 1505 may be performed by a UE scheduling component 925 as described with reference to FIG. 9.

At 1510, the method may include transmitting, via a second set of resources, a second signal indicating a second offset between receiving the first control signal and communicating the first signal. The operations of 1510 may be performed in accordance with examples as disclosed herein. In some examples, aspects of the operations of 1510 may be performed by a UE EH response component 930 as described with reference to FIG. 9.

At 1515, the method may include communicating the first signal via the first set of resources based at least in part on the second offset. The operations of 1515 may be performed in accordance with examples as disclosed herein. In some examples, aspects of the operations of 1515 may be performed by a UE signal transceiver 935 as described with reference to FIG. 9.

Figure 16:
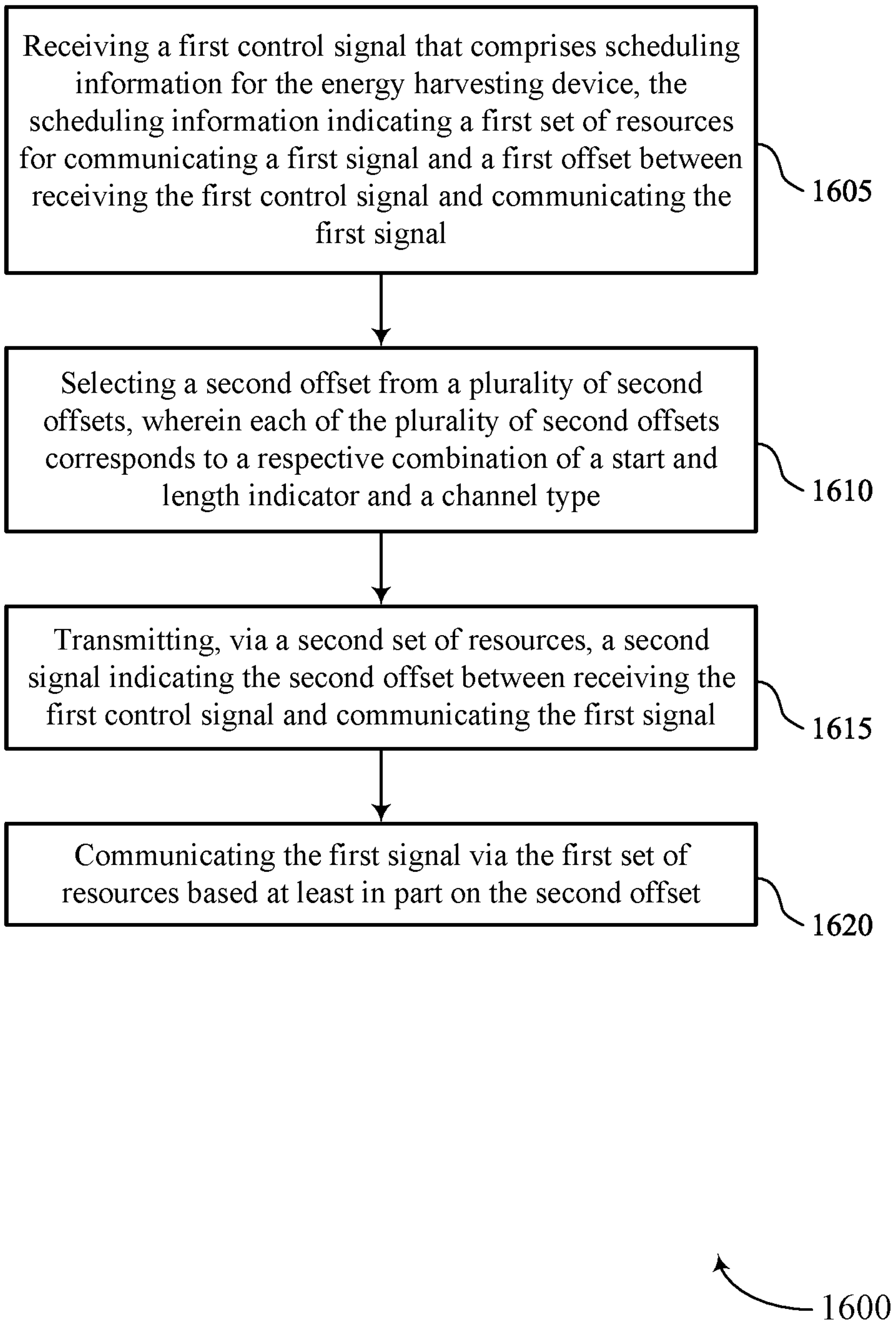

FIG. 16 illustrates a flowchart showing a method 1600 that supports adaptive allocation timing for EH devices in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving a first control signal that comprises scheduling information for the EH device, the scheduling information indicating a first set of resources for communicating a first signal and a first offset between receiving the first control signal and communicating the first signal. The operations of 1605 may be performed in accordance with examples as disclosed herein. In some examples, aspects of the operations of 1605 may be performed by a UE scheduling component 925 as described with reference to FIG. 9.

At 1610, the method may include selecting a second offset from a plurality of second offsets, wherein each of the plurality of second offsets corresponds to a respective combination of a start and length indicator and a channel type. The operations of 1610 may be performed in accordance with examples as disclosed herein. In some examples, aspects of the operations of 1610 may be performed by a UE EH response component 930 as described with reference to FIG. 9.

At 1615, the method may include transmitting, via a second set of resources, a second signal indicating the second offset between receiving the first control signal and communicating the first signal. The operations of 1615 may be performed in accordance with examples as disclosed herein. In some examples, aspects of the operations of 1615 may be performed by a UE EH response component 930 as described with reference to FIG. 9.

At 1620, the method may include communicating the first signal via the first set of resources based at least in part on the second offset. The operations of 1620 may be performed in accordance with examples as disclosed herein. In some examples, aspects of the operations of 1620 may be performed by a UE signal transceiver 935 as described with reference to FIG. 9.

Figure 17:
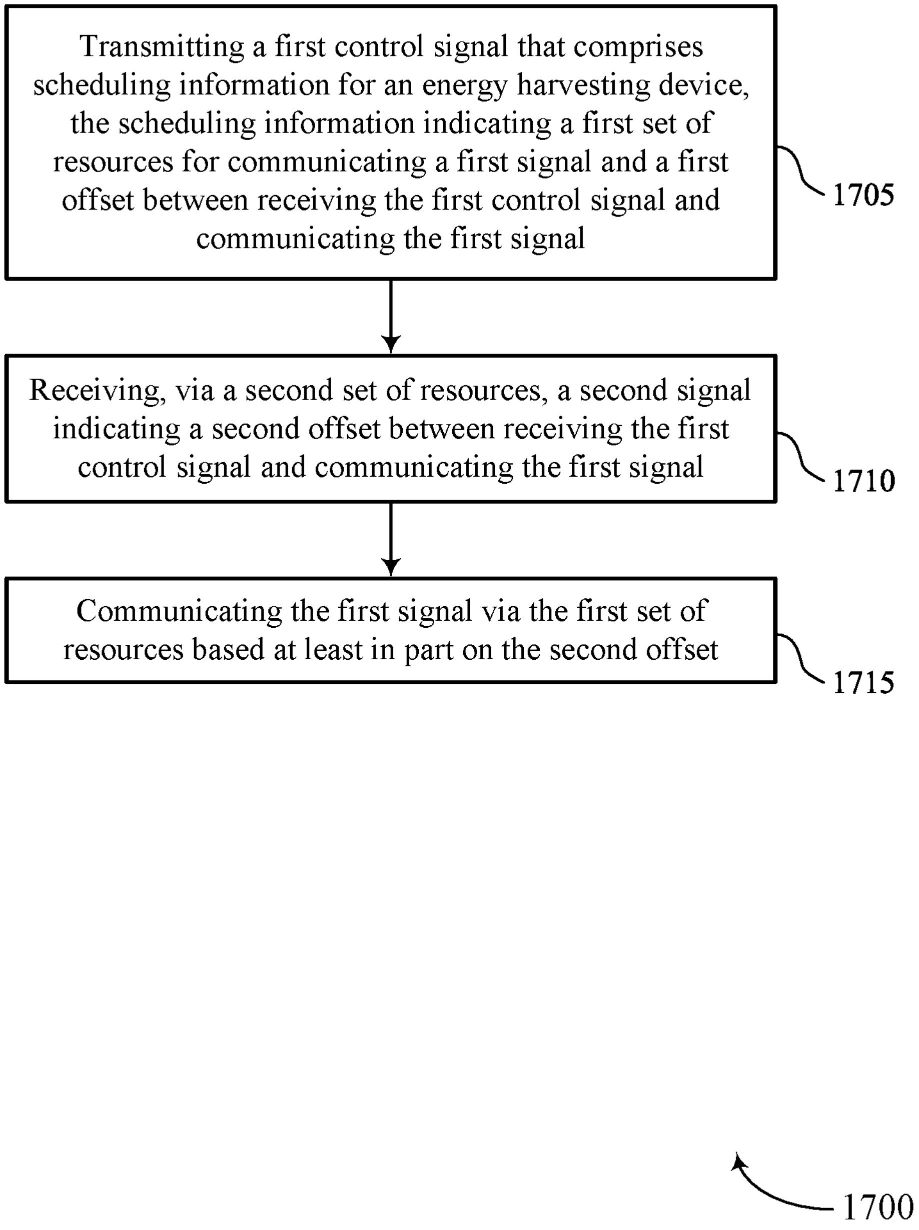

FIG. 17 illustrates a flowchart showing a method 1700 that supports adaptive allocation timing for EH devices in accordance with one or more aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include transmitting a first control signal that comprises scheduling information for an EH device, the scheduling information indicating a first set of resources for communicating a first signal and a first offset between receiving the first control signal and communicating the first signal. The operations of 1705 may be performed in accordance with examples as disclosed herein. In some examples, aspects of the operations of 1705 may be performed by a scheduling component 1325 as described with reference to FIG. 13.

At 1710, the method may include receiving, via a second set of resources, a second signal indicating a second offset between receiving the first control signal and communicating the first signal. The operations of 1710 may be performed in accordance with examples as disclosed herein. In some examples, aspects of the operations of 1710 may be performed by a EH response component 1330 as described with reference to FIG. 13.

At 1715, the method may include communicating the first signal via the first set of resources based at least in part on the second offset. The operations of 1715 may be performed in accordance with examples as disclosed herein. In some examples, aspects of the operations of 1715 may be performed by a signal transceiver 1335 as described with reference to FIG. 13.

Figure 18:
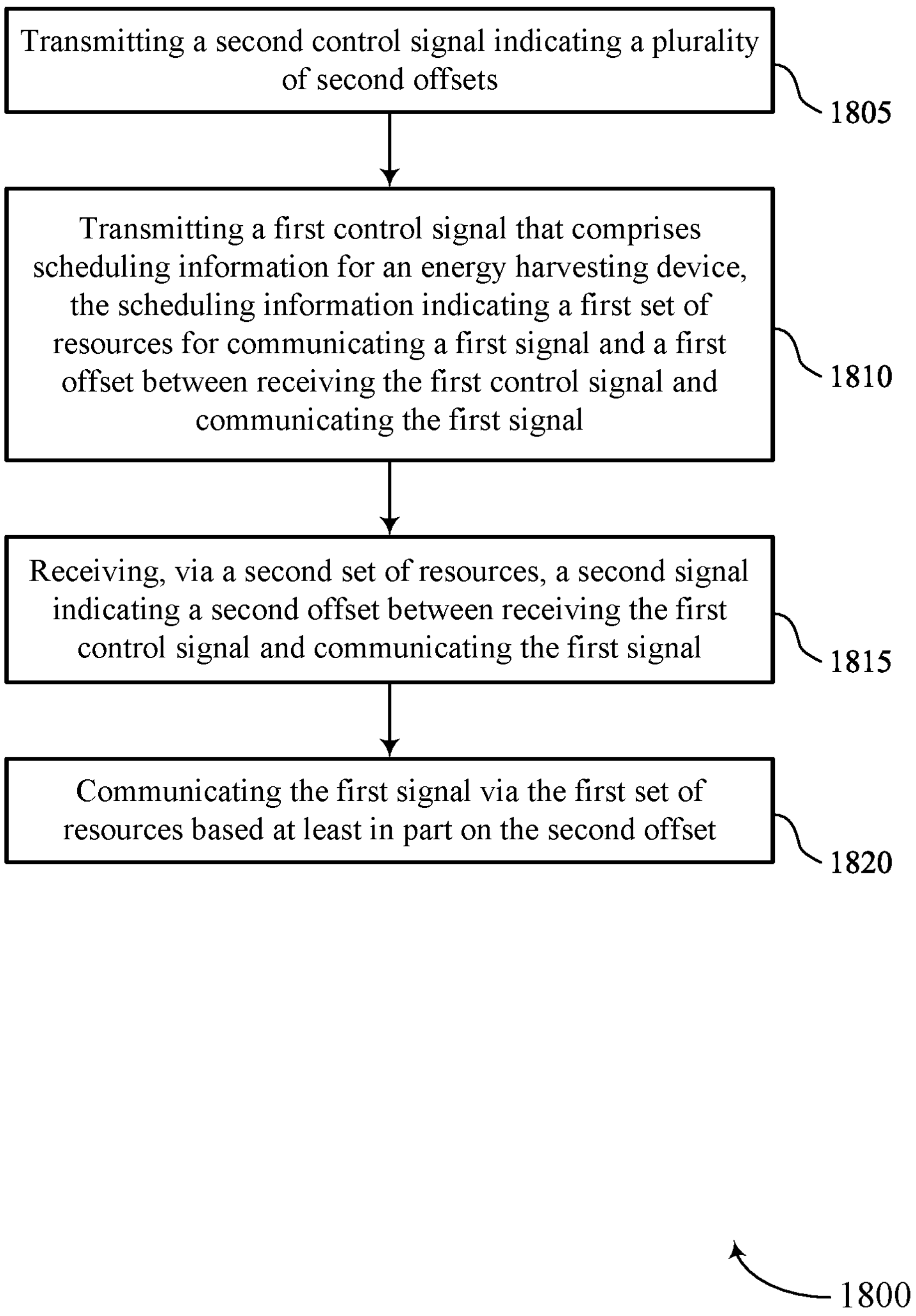

FIG. 18 illustrates a flowchart showing a method 1800 that supports adaptive allocation timing for EH devices in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting a second control signal indicating a plurality of second offsets. The operations of 1805 may be performed in accordance with examples as disclosed herein. In some examples, aspects of the operations of 1805 may be performed by a EH response component 1330 as described with reference to FIG. 13.

At 1810, the method may include transmitting a first control signal that comprises scheduling information for an EH device, the scheduling information indicating a first set of resources for communicating a first signal and a first offset between receiving the first control signal and communicating the first signal. The operations of 1810 may be performed in accordance with examples as disclosed herein. In some examples, aspects of the operations of 1810 may be performed by a scheduling component 1325 as described with reference to FIG. 13.

At 1815, the method may include receiving, via a second set of resources, a second signal indicating a second offset between receiving the first control signal and communicating the first signal. The operations of 1815 may be performed in accordance with examples as disclosed herein. In some examples, aspects of the operations of 1815 may be performed by a EH response component 1330 as described with reference to FIG. 13.

At 1820, the method may include communicating the first signal via the first set of resources based at least in part on the second offset. The operations of 1820 may be performed in accordance with examples as disclosed herein. In some examples, aspects of the operations of 1820 may be performed by a signal transceiver 1335 as described with reference to FIG. 13.

The following provides an overview of aspects of the present disclosure:

Aspect 1: A method for wireless communication at an EH device, comprising: receiving a first control signal that comprises scheduling information for the EH device, the scheduling information indicating a first set of resources for communicating a first signal and a first offset between receiving the first control signal and communicating the first signal; transmitting, via a second set of resources, a second signal indicating a second offset between receiving the first control signal and communicating the first signal; and communicating the first signal via the first set of resources based at least in part on the second offset.

Aspect 2: The method of aspect 1, wherein transmitting the second signal comprising transmitting the second signal during at least a portion of the first offset.

Aspect 3: The method of any of aspects 1 through 2, further comprising: selecting the second offset from a plurality of second offsets, wherein each of the plurality of second offsets corresponds to a respective combination of a start and length indicator and a channel type.

Aspect 4: The method of aspect 3, further comprising: receiving a second control signal indicating the plurality of second offsets.

Aspect 5: The method of any of aspects 1 through 4, further comprising: receiving a second control signal, the second control signal activating a plurality of periodic communication occasions, wherein transmitting the second signal occurs during a periodic communication occasion of the plurality of periodic communication occasions.

Aspect 6: The method of any of aspects 1 through 5, wherein the first control signal further includes a third set of resources for transmitting the second signal.

Aspect 7: The method of any of aspects 1 through 6, further comprising: transmitting, during a third offset that is after the second offset, a third signal via a third set of resources.

Aspect 8: The method of aspect 7, further comprising: receiving a second control signal indicating an enabled state or a disabled state, wherein transmitting the third signal during the third set of resources is based at least in part on the second control signal indicating the enabled state.

Aspect 9: The method of aspect 8, wherein receiving the second control signal comprises: receiving control information, wherein the indication of the enabled state or the disabled state is based at least in part on a value of one or more fields of the control information.

Aspect 10: The method of any of aspects 8 through 9, further comprising: receiving a third control signal indicating the third offset.

Aspect 11: The method of any of aspects 1 through 10, further comprising: transmitting an ACK message associated with the first control signal; and initiating a timer based at least in part on transmitting the ACK message, wherein a duration of the timer comprises the second offset, and wherein the first signal is communicated upon expiration of the timer.

Aspect 12: The method of any of aspects 1 through 11, wherein the first control signal further includes scheduling information for communicating a set of channels, wherein the first signal comprises one channel of the set of channels, the method further comprising: communicating a subset of the set of channels.

Aspect 13: The method of any of aspects 1 through 12, wherein transmitting the second signal comprises: transmitting the second signal prior to receiving the first control signal, wherein the first offset is equal to the second offset.

Aspect 14: The method of any of aspects 1 through 13, wherein the first offset is different from the second offset.

Aspect 15: The method of any of aspects 1 through 14, wherein the second offset is an offset with respect to the first offset.

Aspect 16: The method of any of aspects 1 through 15, wherein the first offset comprises a first duration between receiving the first control signal and communicating the first signal and the second offset comprises a second duration between receiving the first control signal and communicating the first signal.

Aspect 17: The method of any of aspects 1 through 16, further comprising: determining energy status information associated with the EH device, wherein the second offset is based at least in part on the energy status information.

Aspect 18: The method of aspect 17, wherein the energy status information is based at least in part on an amount of power harvested by the EH device, an amount of power to process reference signals at the EH device, an amount of power to process data signals at the EH device, an amount of power to process control signals at the EH device, a battery leakage associated with the EH device, a battery size associated with the EH device, a time to turn on hardware associated with the EH device, a time to harvest power, or a combination thereof.

Aspect 19: The method of any of aspects 1 through 18, wherein communicating the first signal comprises: transmitting the first signal via the first set of resources.

Aspect 20: The method of any of aspects 1 through 18, wherein communicating the first signal comprises: receiving the first signal via the first set of resources.

Aspect 21: A method for wireless communication at a network entity, comprising: transmitting a first control signal that comprises scheduling information for an EH device, the scheduling information indicating a first set of resources for communicating a first signal and a first offset between receiving the first control signal and communicating the first signal; receiving, via a second set of resources, a second signal indicating a second offset between receiving the first control signal and communicating the first signal; and communicating the first signal via the first set of resources based at least in part on the second offset.

Aspect 22: The method of aspect 21, wherein receiving the second signal comprising receiving the second signal during at least a portion of the first offset.

Aspect 23: The method of any of aspects 21 through 22, further comprising: transmitting a second control signal indicating a plurality of second offsets.

Aspect 24: The method of any of aspects 21 through 23, further comprising: transmitting a second control signal, the second control signal activating a plurality of periodic communication occasions, wherein receiving the second signal occurs during a periodic communication occasion of the plurality of periodic communication occasions.

Aspect 25: The method of any of aspects 21 through 24, wherein the first control signal further includes a third set of resources for transmitting the second signal.

Aspect 26: The method of any of aspects 21 through 25, further comprising: receiving, during a third offset that is after the second offset, a third signal via a third set of resources.

Aspect 27: The method of aspect 26, further comprising: transmitting a second control signal indicating an enabled state or a disabled state, wherein receiving the third signal during the third set of resources is based at least in part on the second control signal indicating the enabled state.

Aspect 28: The method of aspect 27, wherein transmitting the second control signal comprises: transmitting control information, wherein the indication of the enabled state or the disabled state is based at least in part on a value of one or more fields of the control information.

Aspect 29: The method of any of aspects 27 through 28, further comprising: transmitting a third control signal indicating the third offset.

Aspect 30: The method of any of aspects 21 through 29, further comprising: receiving an ACK message associated with the first control signal; and initiating a timer based at least in part on receiving the ACK message, wherein a duration of the timer comprises the second offset, and wherein the first signal is communicated upon expiration of the timer.

Aspect 31: The method of any of aspects 21 through 30, wherein receiving the second signal comprises: receiving the second signal prior to receiving the first control signal, wherein the first offset is equal to the second offset.

Aspect 32: The method of any of aspects 21 through 31, wherein the first offset is different from the second offset.

Aspect 33: The method of any of aspects 21 through 32, wherein the second offset is an offset with respect to the first offset.

Aspect 34: The method of any of aspects 21 through 33, wherein the first offset comprises a first number of time unit between a time unit used for transmitting the first control signal and a time unit for communicating the first signal and the second offset comprises a second number of time units between the time unit used for transmitting the first control signal and the time unit for communicating the first signal.

Aspect 35: The method of any of aspects 21 through 34, wherein the second offset is based at least in part on energy status information associated with the EH device, and the energy status information is based at least in part on an amount of power harvested by the EH device, an amount of power to process reference signals at the EH device, an amount of power to process data signals at the EH device, an amount of power to process control signals at the EH device, a battery leakage associated with the EH device, a battery size associated with the EH device, a time to turn on hardware associated with the EH device, a time to harvest power, or a combination thereof.

Aspect 36: The method of any of aspects 21 through 35, wherein communicating the first signal comprises: transmitting the first signal via the first set of resources.

Aspect 37: The method of any of aspects 21 through 35, wherein communicating the first signal comprises: receiving the first signal via the first set of resources.

Aspect 38: An apparatus for wireless communication at an EH device, comprising at least one processor and memory coupled with the at least one processor, the memory storing instructions for the at least one processor to cause the EH device to perform a method of any of aspects 1 through 20.

Aspect 39: An apparatus for wireless communication at an EH device, comprising at least one means for performing a method of any of aspects 1 through 20.

Aspect 40: A non-transitory computer-readable medium storing code for wireless communication at an EH device, the code comprising instructions executable by at least one processor to perform a method of any of aspects 1 through 20.

Aspect 41: An apparatus for wireless communication at a network entity, comprising at least one processor and memory coupled with the at least one processor, the memory storing instructions for the at least one processor to cause the network entity to perform a method of any of aspects 21 through 37.

Aspect 42: An apparatus for wireless communication at a network entity, comprising at least one means for performing a method of any of aspects 21 through 37.

Aspect 43: A non-transitory computer-readable medium storing code for wireless communication at a network entity, the code comprising instructions executable by at least one processor to perform a method of any of aspects 21 through 37.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, a GPU, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at an energy harvesting device, comprising:
at least one processor; and
memory coupled with the at least one processor, the memory storing instructions for the at least one processor to cause the energy harvesting device to:
receive a first control signal that comprises scheduling information for the energy harvesting device, the scheduling information indicating a first set of resources for communicating a first signal and a first time offset between receiving the first control signal and communicating the first signal;
determine a second time offset between receiving the first control signal and communicating the first signal as a function of predicted power consumption or predicted power harvesting at the energy harvesting device for communicating the first signal;
transmit, via a second set of resources, a second signal indicating the second time offset between receiving the first control signal and communicating the first signal; and
communicate the first signal via the first set of resources based at least in part on the second time offset.

2. The apparatus of claim 1, wherein the instructions to transmit the second signal are for the at least one processor to cause the energy harvesting device to:
transmit the second signal during at least a portion of the first time offset.

3. The apparatus of claim 1, wherein the instructions to determine the second time offset are for the at least one processor to cause the energy harvesting device to:
select the second time offset from a plurality of second time offsets, wherein each of the plurality of second time offsets corresponds to a respective combination of a start and length indicator and a channel type.

4. The apparatus of claim 3, wherein the instructions are further for the at least one processor to cause the energy harvesting device to:
receive a second control signal indicating the plurality of second time offsets.

5. The apparatus of claim 1, wherein the instructions are further for the at least one processor to cause the energy harvesting device to:
receive a second control signal, the second control signal activating a plurality of periodic communication occasions, wherein to transmit the second signal occurs during a periodic communication occasion of the plurality of periodic communication occasions.

6. The apparatus of claim 1, wherein the first control signal further includes a third set of resources for transmitting the second signal.

7. The apparatus of claim 1, wherein the instructions are further for the at least one processor to cause the energy harvesting device to:
transmit, during a third offset that is after the second time offset, a third signal via a third set of resources.

8. The apparatus of claim 7, wherein the instructions are further for the at least one processor to cause the energy harvesting device to:
receive a second control signal indicating an enabled state or a disabled state, wherein to transmit the third signal during the third set of resources is based at least in part on the second control signal indicating the enabled state.

9. The apparatus of claim 8, wherein the instructions to receive the second control signal are for the at least one processor to cause the energy harvesting device to:
receive control information, wherein an indication of the enabled state or the disabled state is based at least in part on a value of one or more fields of the control information.

10. The apparatus of claim 8, wherein the instructions are further for the at least one processor to cause the energy harvesting device to:
receive a third control signal indicating the third offset.

11. The apparatus of claim 1, wherein the instructions are further for the at least one processor to cause the energy harvesting device to:
transmit an acknowledgment message associated with the first control signal; and
initiate a timer based at least in part on transmitting the acknowledgment message, wherein a duration of the timer comprises the second time offset, and wherein the first signal is communicated upon expiration of the timer.

12. The apparatus of claim 1, wherein the first control signal further includes second scheduling information for communicating a set of channels, and wherein the instructions are further executable by the at least one processor to cause the apparatus to:
communicate a subset of the set of channels.

13. The apparatus of claim 1, wherein the instructions to transmit the second signal are for the at least one processor to cause the energy harvesting device to:
transmit the second signal prior to receiving the first control signal, wherein the first time offset is equal to the second time offset.

14. The apparatus of claim 1, wherein the first time offset is different from the second time offset.

15. The apparatus of claim 1, wherein the second time offset is between an end of the first time offset and communicating the first signal.

16. An apparatus for wireless communication at a network entity, comprising:
at least one processor; and
memory coupled with the at least one processor, the memory storing instructions for the at least one processor to cause the network entity to:
transmit a first control signal indicating a plurality of time offsets;
transmit a second control signal that comprises scheduling information for an energy harvesting device, the scheduling information indicating a first set of resources for communicating a first signal and a first time offset between receiving the second control signal and communicating the first signal;
receive, via a second set of resources, a second signal indicating a second time offset between receiving the second control signal and communicating the first signal, wherein the indicated second time offset between receiving the second control signal and communicating the first signal is from the indicated plurality of time offsets based at least in part on power consumption or power harvesting at the energy harvesting device; and communicate the first signal via the first set of resources based at least in part on the second time offset.

17. The apparatus of claim 16, wherein the instructions to receive the second signal are for the at least one processor to cause the network entity to:

receive the second signal during at least a portion of the first time offset.

18. The apparatus of claim 16, wherein the instructions are further for the at least one processor to cause the network entity to:

transmit a third control signal, the second control signal activating a plurality of periodic communication occasions, wherein to receive the second signal occurs during a periodic communication occasion of the plurality of periodic communication occasions.

19. The apparatus of claim 16, wherein the second control signal further includes a third set of resources for transmitting the second signal.

20. The apparatus of claim 16, wherein the instructions are further for the at least one processor to cause the network entity to:

receive, during a third offset that is after the second time offset, a third signal via a third set of resources.

21. The apparatus of claim 20, wherein the instructions are further for the at least one processor to cause the network entity to:

transmit a third control signal indicating an enabled state or a disabled state, wherein to receive the third signal during the third set of resources is based at least in part on the second control signal indicating the enabled state.

22. The apparatus of claim 21, wherein the instructions to transmit the second control signal are for the at least one processor to cause the network entity to:

transmit control information, wherein an indication of the enabled state or the disabled state is based at least in part on a value of one or more fields of the control information.

23. The apparatus of claim 21, wherein the instructions are further for the at least one processor to cause the network entity to:

transmit a fourth control signal indicating the third offset.

24. The apparatus of claim 16, wherein the instructions are further for the at least one processor to cause the network entity to:

receive an acknowledgment message associated with the second control signal; and initiate a timer based at least in part on receiving the acknowledgment message, wherein a duration of the timer comprises the second time offset, and wherein the first signal is communicated upon expiration of the timer.

25. The apparatus of claim 16, wherein the instructions to receive the second signal are for the at least one processor to cause the network entity to:

receive the second signal prior to receiving the second control signal, wherein the first time offset is equal to the second time offset.

26. A method for wireless communication at an energy harvesting device, comprising:

receiving a first control signal that comprises scheduling information for the energy harvesting device, the scheduling information indicating a first set of resources for communicating a first signal and a first time offset between receiving the first control signal and communicating the first signal;

determine a second time offset between receiving the first control signal and communicating the first signal as a function of predicted power consumption or predicted power harvesting at the energy harvesting device for communicating the first signal;

transmitting, via a second set of resources, a second signal indicating the second time offset between receiving the first control signal and communicating the first signal; and communicating the first signal via the first set of resources based at least in part on the second time offset.

27. The method of claim 26, further comprising:

selecting the second time offset from a plurality of second time offsets, wherein each of the plurality of second time offsets corresponds to a respective combination of a start and length indicator and a channel type.

28. A method for wireless communication at a network entity, comprising:

transmit a first control signal indicating a plurality of time offsets;

transmitting a second control signal that comprises scheduling information for an energy harvesting device, the scheduling information indicating a first set of resources for communicating a first signal and a first time offset between receiving the second control signal and communicating the first signal;

receiving, via a second set of resources, a second signal indicating a second time offset between receiving the second control signal and communicating the first signal, wherein the indicated second time offset between receiving the second control signal and communicating the first signal is from the indicated plurality of time offsets based at least in part on power consumption or power harvesting at the energy harvesting device; and communicating the first signal via the first set of resources based at least in part on the second time offset.

* * * * *